(12) United States Patent
Zeng et al.

(10) Patent No.: US 9,147,123 B2
(45) Date of Patent: Sep. 29, 2015

(54) SYSTEM AND METHOD TO PERFORM FEATURE DETECTION AND TO DETERMINE A FEATURE SCORE

(75) Inventors: Mao Zeng, Austin, TX (US); Erich James Plondke, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 13/602,677

(22) Filed: Sep. 4, 2012

(65) Prior Publication Data

US 2013/0322762 A1 Dec. 5, 2013

Related U.S. Application Data

(60) Provisional application No. 61/653,683, filed on May 31, 2012.

(51) Int. Cl.
*G06K 9/68* (2006.01)
*G06K 9/46* (2006.01)

(52) U.S. Cl.
CPC .................... *G06K 9/4638* (2013.01)

(58) Field of Classification Search
CPC .................. G06K 9/68; G06K 9/46
USPC .................................. 382/195, 218
See application file for complete search history.

(56) References Cited

U.S. PATENT DOCUMENTS

| | | | |
|---|---|---|---|
| 5,144,684 A | 9/1992 | Inada et al. | |
| 5,940,535 A | 8/1999 | Huang | |
| 7,489,834 B2 | 2/2009 | Kloth | |
| 8,059,905 B1 * | 11/2011 | Christian | 382/254 |
| 2008/0310729 A1 | 12/2008 | Yoshino | |
| 2011/0222774 A1 * | 9/2011 | Hong et al. | 382/190 |
| 2012/0275711 A1 | 11/2012 | Inaba et al. | |

(Continued)

FOREIGN PATENT DOCUMENTS

GB 2446190 A 8/2008

OTHER PUBLICATIONS

Faster and Better: A Machine Learning Approach to Corner Detection. Edward Rosten, Reid Porter, and Tom Drummond. IEEE Nov. 2008 Published Online.*

(Continued)

*Primary Examiner* — Stephen R Koziol
*Assistant Examiner* — Delomia Gilliard
(74) *Attorney, Agent, or Firm* — Peter Michael Kamarchik; Nicholas J. Pauley; Paul Holdaway

(57) ABSTRACT

A system and method of processing an image is disclosed. A particular method of determining whether a particular pixel of an image is a feature includes receiving data corresponding to a plurality of pixels (from the image) surrounding the particular pixel. The method further includes determining a set of comparison results, each corresponding to one of the plurality of pixels and indicating a result of comparing an attribute value corresponding to one of the plurality of pixels to a comparison value (based on a particular attribute value of the particular pixel and a threshold value). The method further includes performing a processor-executable instruction that, when executed by a processor, causes the processor to identify a subset of the set of comparison results that indicate the particular pixel is the feature. The identified subset may be a consecutive order of pixels of the plurality of pixels.

42 Claims, 10 Drawing Sheets

(56) References Cited

U.S. PATENT DOCUMENTS

2013/0015946 A1* 1/2013 Lau et al. .................. 340/5.2
2013/0322761 A1 12/2013 Zeng et al.

OTHER PUBLICATIONS

Fast Corner Detection. Miroslav Trajkovic, Mark Hedley. Image and Vision Computing 1998.*
International Search Report and Written Opinion—PCT/US2013/043419—ISA/EPO—Aug. 26, 2013.
Kraft M., et al., "System on Chip Coprocessors for High Speed Image Feature Detection and Matching", Aug. 22, 2011, Advances Concepts for Intelligent Vision Systems, Springer Berlin Heidelberg, Berlin, Heidelberg, pp. 599-610, XP019161128, ISBN: 978-3-642-23686-0.
Rosten E., et al., "Faster and Better: A Machine Learning Approach to Corner Detection", Transactions on Pattern Analysis and Machine Intelligence. IEEE. Piscataway, USA, vo 1. 32. No. 1. Jan. 1, 2010, pp. 105-119, XP011321483, ISSN: 0162-8828. DOI: 10.1109/TPAMI.2008.275.
Rosten E., et al., "Machine Learning for High-Speed Corner Detection", Jan. 1, 2006, Computer Vision—ECCV 2006: 9th European Conference on Computer Vision, Graz, Austria, May 7-13, 2006; Proceedings; [Lecture Notes in Computer Science], Springer, Berlin, DE, pp. 430-443, XP019036410, ISBN: 978-3-540-33832-1.
Viswanathan D G, "Features from Accelerated Segment Test (FAST)", 2009, pp. 1-5. http://homepages.inf.ed.ac.uk/rbf/CVonline/LOCAL_COPIES/AV1011/AV1FeaturefromAcceleratedSegmentTest.pdf.

* cited by examiner

SYSTEM AND METHOD TO PERFORM FEATURE DETECTION AND TO DETERMINE A FEATURE SCORE

I. CLAIM OF PRIORITY

This application claims priority from U.S. Provisional Patent Application No. 61/653,683, filed May 31, 2012, entitled "SYSTEM AND METHOD TO PERFORM FEATURE DETECTION AND TO DETERMINE A FEATURE SCORE," the contents of which are incorporated by reference in its entirety.

II. FIELD

The present disclosure is generally related to image processing.

III. DESCRIPTION OF RELATED ART

Products having facial recognition applications, gesture control interfaces, and augmented reality applications depend on computer vision algorithms that provide methods for acquiring, processing, and analyzing images. One aspect of computer vision is feature detection that involves processing and computing of image information to identify points of interest within an image. Feature detection based on a Features from Accelerated Segment Test ("FAST") process (e.g., FAST9, FAST10, FAST11, FAST12, etc.) analyzes a set of pixels in a circular arrangement surrounding a candidate pixel.

A software implementation of feature detection may have limited efficiency for processing an image. For example, a software implementation of feature detection may have numerous lines of code and may involve execution of many compare instructions, conditional branch instructions, and jump instructions. Thus, a significant amount of processing time and processor resources may be consumed to execute the feature detection. Data level parallelism of a processor may be limited due to a large number of conditional branch instructions that are being executed for the feature detection algorithm. Additionally, implementing a significant number of compare, conditional branch, and jump instructions on a microprocessor, such as a digital signal processor (DSP), can affect execution efficiency due to instruction latency.

Advances in technology have resulted in smaller and more powerful computing devices such as portable personal computing devices, including wireless computing devices that are small, lightweight, and easily carried by users. Further, many such wireless computing devices include other types of devices that are incorporated therein. For example, a wireless telephone can also include a digital still camera, a digital video camera, a digital recorder, and an audio file player. Although wireless computing devices may have significant computing capabilities, conventional feature detection may be too complex and ill-suited for adaptation to into such wireless computing devices such as wireless telephones.

IV. SUMMARY

Feature detection involves processing of pixels (candidate pixels) within an image to determine whether one or more of the pixels represents a feature (e.g. a corner) of an image that may be defined based on one or more pixel attributes (e.g., intensity, luminescence, hue, chromaticity, brightness, saturation, etc.). To determine whether a candidate pixel represents a feature, a plurality of pixels that surrounds the candidate pixel may be analyzed according to a feature detection process (e.g. FAST). Such analysis may involve performing a comparison of each pixel of the plurality of pixels to the candidate pixel with respect to a pixel attribute. A set of results produced by such an analysis may indicate whether each pixel of the plurality of pixels differs from the candidate pixel by a particular amount with respect to the pixel attribute. The particular amount may be defined based on a threshold value. The candidate pixel may be identified as a feature based on the comparison results.

The set of results produced by the analysis of the plurality of pixels may be processed using a table lookup operation to determine whether the set of results indicate that the candidate pixel is a feature. The table lookup operation may search a feature lookup table to determine whether the set of results match a predetermined pattern that indicates the candidate pixel is a feature with respect to the pixel attribute that was considered to determine the set of results. Each pattern in the feature lookup table may be defined based on a predetermined set of results. The predetermined set of results may be produced by a comparison of the plurality of pixels to the candidate pixel based on the pixel attribute.

Alternatively, the set of results produced by the analysis of the plurality of pixels may also be processed by a feature identification instruction (processor-executable instruction) that may generate a result indicating whether the set of results indicate that the candidate pixel is a feature. Execution of the feature identification instruction may include comparisons of each result of the set of results to determine whether a particular combination exists that indicates the candidate pixel is a feature.

A candidate pixel may be further processed to determine a feature score for the candidate pixel. The feature score may be indicative of strength of the particular feature. The strength of a feature may indicate a degree of difference between the candidate pixel and the plurality of pixels with respect to a particular pixel attribute. A feature score may be calculated by performing one or more iterations of a feature detection process for the candidate pixel, where a plurality of pixels that surround the candidate pixel are compared to the candidate pixel with respect to a particular attribute and a threshold attribute value. A first iteration may be performed based on an initial threshold attribute value to determine whether the candidate pixel is a feature. For a candidate pixel that is not identified as a feature, the feature score may have a value of 0 or another value that is less than the initial threshold value. Once a candidate pixel is identified as a feature, subsequent iterations may be performed using a modified threshold attribute value that is based on modification of the threshold attribute value. The iterations are performed until a maximum threshold attribute value can be determined such that the iteration results in identification of the candidate pixel as the feature. The feature score for the candidate pixel may be defined based on the maximum threshold attribute value that indicated the candidate pixel is a feature.

In a particular embodiment, a method includes determining whether a particular pixel of an image is a feature. Determining whether the particular pixel of an image is a feature includes receiving data corresponding to a plurality of pixels surrounding the particular pixel. Each of the plurality of pixels is from the image. Determining whether the particular pixel of an image is a feature includes determining a set of comparison results associated with the plurality of pixels. Each comparison result of the set of comparison results corresponds to one of the plurality of pixels and indicates a result of comparing an attribute value corresponding to the one of the plurality of pixels to a comparison value. The comparison value is defined based on a particular attribute value of the particular pixel and a threshold value. Determining whether the particular pixel of an image is a feature includes determining whether the set of comparison results indicates that the particular pixel is the feature by performing a table lookup operation using the set of comparison results as an index.

In a particular embodiment, a method of processing an image includes receiving data corresponding to a plurality of pixels surrounding the particular pixel. Each of the plurality of pixels is from the image. The method further includes determining a set of comparison results associated with the plurality of pixels. Each comparison result of the set of comparison results corresponds to one of the plurality of pixels and indicates a result of comparing an attribute value corresponding to the one of the plurality of pixels to a comparison value. The comparison value is defined based on a particular attribute value of the particular pixel and a threshold value. The method further includes determining whether the particular pixel of an image is a feature by performing a processor-executable instruction that, when executed by a processor, causes the processor to identify a subset of the set of comparison results indicating that the particular pixel is the feature. The identified subset corresponds to pixels of the plurality of pixels located in a consecutive order surrounding the particular pixel.

In another particular embodiment, a method of processing an image includes determining whether a particular pixel of an image satisfies a first feature test based on a first operation that depends on a particular attribute value of the particular pixel, a threshold value, and attribute values of each of a plurality of pixels surrounding the particular pixel. The method further includes modifying the threshold value, in response to determining that the particular pixel satisfies the first feature test. The method further includes determining whether the particular pixel of the image satisfies a second feature test based on a second operation that depends on the particular attribute value of the particular pixel, the modified threshold value, and the attribute values of each of the plurality of pixels surrounding the particular pixel. The method further includes determining a score associated with the particular pixel where, when the particular pixel satisfies the second feature test based on the second operation, the score is based on the modified threshold value.

In another particular embodiment, an apparatus includes a processor and a memory accessible to the processor. The memory includes instructions that, when executed by the processor, cause the processor to determine whether a particular pixel of an image is a feature. Determining whether the particular pixel of an image is a feature includes receiving data corresponding to a plurality of pixels surrounding the particular pixel. Each of the plurality of pixels is from the image. Determining whether the particular pixel of an image is a feature includes determining a set of comparison results associated with the plurality of pixels. Each comparison result of the set of comparison results corresponds to one of the plurality of pixels and indicates a result of comparing an attribute value corresponding to the one of the plurality of pixels to a comparison value. The comparison value is defined based on a particular attribute value of the particular pixel and a threshold value. Determining whether the particular pixel of an image is a feature includes determining whether the set of comparison results indicates that the particular pixel is the feature by performing a table lookup operation using the set of comparison results as an index.

In another particular embodiment, an apparatus includes a processor and a memory accessible to the processor. The memory includes instructions that, when executed by the processor, cause the processor to receive data corresponding to a plurality of pixels surrounding the particular pixel. Each of the plurality of pixels is from the image. The instructions, when executed by the processor, further cause the processor to determine a set of comparison results associated with the plurality of pixels. Each comparison result of the set of comparison results corresponds to one of the plurality of pixels and indicates a result of comparing an attribute value corresponding to the one of the plurality of pixels to a comparison value. The comparison value is defined based on a particular attribute value of the particular pixel and a threshold value. The instructions, when executed by the processor, further cause the processor to determine whether the particular pixel of an image is a feature by executing a processor-executable instruction that causes the processor to identify a subset of the set of comparison results indicating that the particular pixel is the feature. The identified subset corresponds to pixels of the plurality of pixels located in a consecutive order surrounding the particular pixel.

In another particular embodiment, an apparatus includes a processor and a memory accessible to the processor. The memory includes instructions that, when executed by the processor, cause the processor to determine whether a particular pixel of an image satisfies a first feature test based on a first operation that depends on a particular attribute value of the particular pixel, a threshold value, and attribute values of each of a plurality of pixels surrounding the particular pixel. The instructions, when executed by the processor, further cause the processor to modify the threshold value in response to determining that the particular pixel satisfies the first feature test. The instructions, when executed by the processor, further cause the processor to determine whether the particular pixel of the image satisfies a second feature test based on a second operation that depends on the particular attribute value of the particular pixel, the modified threshold value, and the attribute values of each of the plurality of pixels surrounding the particular pixel. The instructions, when executed by the processor, further cause the processor to determine a score associated with the particular pixel, where, when the particular pixel satisfies the second feature test based on the second operation, the score is based on the modified threshold value.

In another particular embodiment, a non-transitory processor-readable medium stores instructions that, when executed by a processor, cause the processor to determine whether a particular pixel of an image is a feature. Determining whether the particular pixel of an image is a feature includes receiving data corresponding to a plurality of pixels surrounding the particular pixel. Each of the plurality of pixels is from the image. Determining whether the particular pixel of an image is a feature includes determining a set of comparison results associated with the plurality of pixels. Each comparison result of the set of comparison results corresponds to one of the plurality of pixels and indicates a result of comparing an attribute value corresponding to the one of the plurality of pixels to a comparison value. The comparison value is defined based on a particular attribute value of the particular pixel and a threshold value. Determining whether the particular pixel of an image is a feature includes determining whether the set of comparison results indicates that the particular pixel is the feature by performing a table lookup operation using the set of comparison results as an index.

In another particular embodiment, a non-transitory processor-readable medium stores instructions that, when executed by a processor, cause the processor to receive data corresponding to a plurality of pixels surrounding the particular pixel. Each of the plurality of pixels is from the image. The instructions, when executed by the processor, further cause the processor to determine a set of comparison results associated with the plurality of pixels. Each comparison result of the set of comparison results corresponds to one of the plurality of pixels and indicates a result of comparing an attribute value corresponding to the one of the plurality of pixels to a comparison value. The comparison value is defined based on a particular attribute value of the particular pixel and a threshold value. The instructions include one processor-executable instruction that, when executed by the processor, causes the processor to identify a subset of the set of comparison results indicating that the particular pixel is the feature. The identified subset corresponds to pixels of the plurality of pixels located in a consecutive order surrounding the particular pixel.

In another particular embodiment, a non-transitory processor-readable medium stores instructions that, when executed by a processor, cause the processor to determine whether a particular pixel of an image satisfies a first feature test based on a first operation that depends on a particular attribute value of the particular pixel, a threshold value, and attribute values of each of a plurality of pixels surrounding the particular pixel. The instructions, when executed by the processor, further cause the processor to modify the threshold value, in response to determining that the particular pixel satisfies the first feature test. The instructions, when executed by the processor, further cause the processor to determine whether the particular pixel of the image satisfies a second feature test based on a second operation that depends on the particular attribute value of the particular pixel, the modified threshold value, and the attribute values of each of the plurality of pixels surrounding the particular pixel. The instructions, when executed by the processor, further cause the processor to determine a score associated with the particular pixel, where, when the particular pixel satisfies the second feature test based on the second operation, the score is based on the modified threshold value.

Particular advantages provided by at least one of the disclosed embodiments include reducing an amount of processing performed to identify pixels of an image that are features. Accuracy of identification of relevant features of an image may be improved by a feature score that indicates a degree of difference between a particular pixel and surrounding pixels with respect to a particular attribute.

Other aspects, advantages, and features of the present disclosure will become apparent after review of the entire application, including the following sections: Brief Description of the Drawings. Detailed Description, and the Claims.

V. BRIEF DESCRIPTION OF THE DRAWINGS

VI. DETAILED DESCRIPTION

Particular embodiments of the present disclosure are described below with reference to the drawings. In the description, common elements are designated by common reference numbers throughout the drawings.

Figure 1:
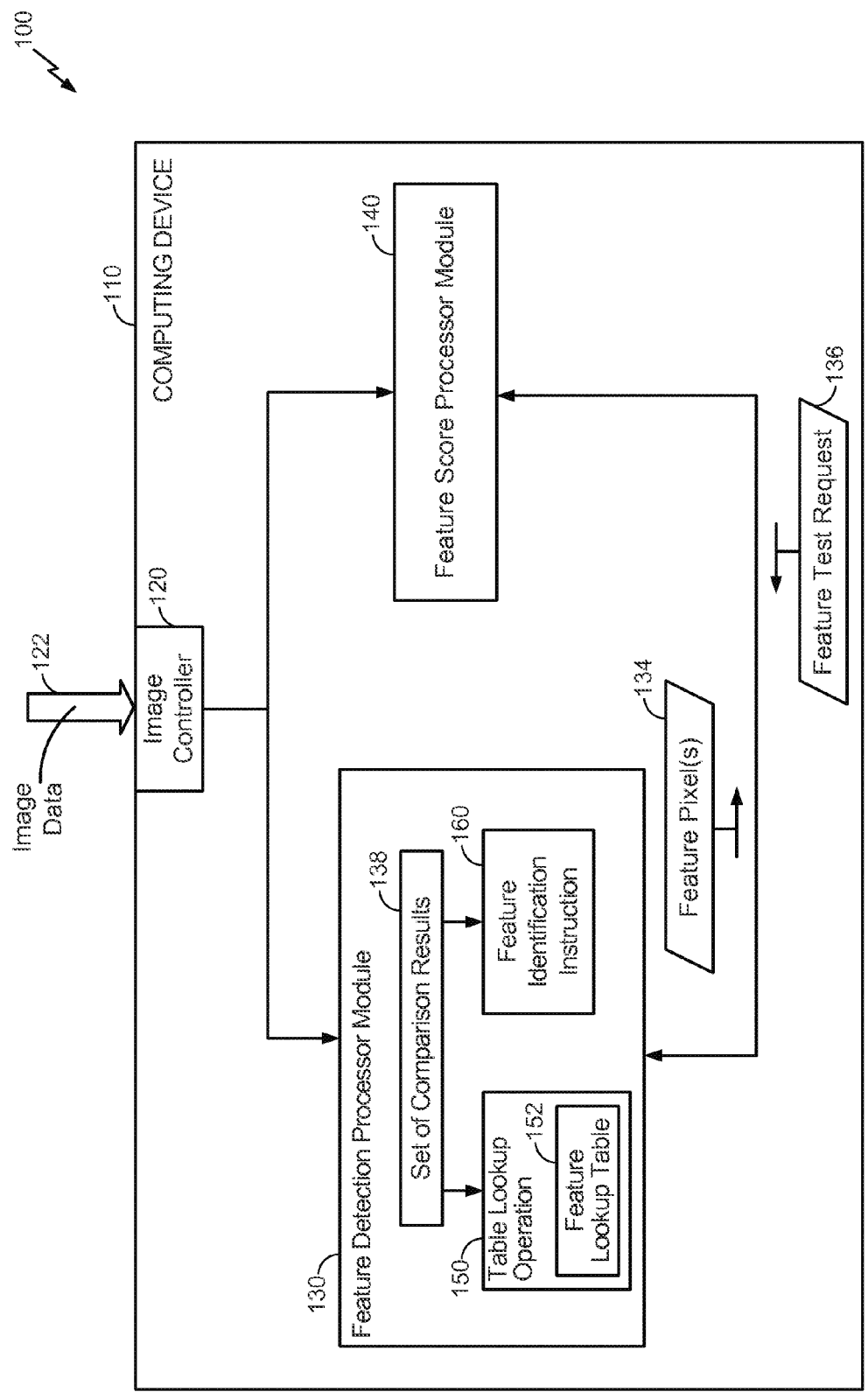
FIG. 1 is a block diagram of a particular embodiment of a system to determine whether a pixel of an image is a feature and to determine a score associated with the feature.

Referring to FIG. 1, a particular embodiment of a system 100 to determine whether a pixel of an image is a feature and to determine a score associated with the feature is illustrated. The system 100 includes an image controller 120 to receive image data 122, such as frames, pixels, or image streams that may include an image or a portion of the image. The system 100 also includes a feature detection processor module 130 and a feature score processor module 140. Particular embodiments of the system 100 may include the feature detection processor module 130 or the feature score processor module 140, but not both. The system 100 may be integrated into various electronic devices, including but not limited to, a mobile phone, a computing device, a portable electronic device, a tablet computing device, an electronic reader device, a game console, a camera, a peripheral thereof, or a combination thereof.

In particular embodiments, one or more functions or methods described herein as being performed by the feature detection processor module 130 and the feature score processor module 140 may be implemented using instructions that are executed by a processor of the computing device 110. The instructions executed by the processor may be stored within memory of the computing device, or may be in local storage associated with the processor.

In particular embodiments, one or more functions described herein as being performed by feature detection processor module 130 and the feature score processor module 140 may be performed by dedicated hardware, such as a programmable logic array, a field-programmable gate array (FPGA) device, an application-specific integrated circuit (ASIC), another hardware device, or any combination thereof.

The feature detection processor module 130 may be configured to process one or more pixels of an image included in the image data 122 to determine whether the one or more pixels are a feature of the image. For example, the feature of the image may correspond to a corner. A particular pixel (e.g. a "candidate pixel") of the image that is a distinguishable feature may be identified based on one or more criteria that define the feature including one or more attributes (e.g., intensity, luminescence, hue, chromaticity, brightness, saturation, etc.) associated with the particular pixel. The one or more pixels of the image data 122 may be processed according to a particular feature detection process such as described with reference to FIGS. 2-9.

For purposes of description, the methods or functions described herein are based on an implementation of a FAST-type feature detection (e.g., FAST9). However, the methods or functions described herein may be performed based on other feature detection implementations. In a FAST-type implementation, a set of pixels (e.g., 16 pixels) that surround a candidate pixel of an image are analyzed to determine whether the candidate pixel is a feature. When FAST is implemented based on a set of 16 surrounding pixels, the candidate pixel may be considered a feature when at least 9 contiguous pixels of the set of 16 pixels have an attribute value that differs from the candidate pixel by more than a particular threshold.

In a particular embodiment, the feature detection processor module 130 is configured to process data associated with a plurality of pixels of an image that surround a particular pixel of the image to determine whether the particular pixel of the image is a feature. For example, processing according to FAST may include comparing a value (e.g., an attribute value) of each surrounding pixel to criteria that define a feature of the image with respect to the candidate pixel. For example, the criteria may be defined based on a comparison value that is associated with the one or more attributes (e.g., intensity, luminescence, hue, chromaticity, brightness, saturation, etc.) that define a feature of the image. The comparison value may also be defined based on an adjustable threshold value that further defines the feature with respect to the attribute.

The feature detection processor module 130 may generate a set of comparison results 138 by performing a comparison of each of the surrounding pixels to the comparison value. Each comparison result of the set of comparison results 138 may correspond to a result of a comparison of one of the plurality of pixels to the comparison value. Each comparison result may be a logic value of 0 or 1, where a value of 0 indicates that the condition that defines the feature has not been satisfied and where a value of 1 indicates that the condition that defines the feature has been satisfied, or vice versa. For example, when feature detection is implemented by examining 16 surrounding pixels, the set of comparison results 138 may include sixteen logic values, each having a value of a 0 or 1 (e.g., "1111111111000000"). After the set of comparison results 138 is generated, the set of comparison results 138 may be used to determine whether the candidate pixel is a feature. For example, in the case of FAST, the set of comparison results 138 may be examined to determine whether the set of comparison results 138 includes 9 consecutive ones (when a value of one indicates that the feature determination criteria is satisfied) or zeros (when a value of zero indicates that the feature determination criteria is satisfied). To accelerate processing of the set of comparison results 138, a table lookup operation 150 may be performed using the set of comparison results 138 to determine whether the candidate pixel is a feature. In another particular embodiment, a feature identification instruction 160 may process the set of comparison results 138 to determine whether the candidate pixel is a feature of the image.

The table lookup operation 150 may be used to determine whether a particular pixel is the feature by performing an operation (e.g. a read operation) on a feature lookup table 152 using the set of comparison results 138. In a particular embodiment, the set of comparison results 138 may be used as an index to the feature lookup table 152 to determine whether the set of comparison results 138 represents a pattern that indicates the particular pixel is a feature. The feature lookup table 152 may include one or more entries, each entry having an index value that is based on a pattern (e.g., bit sequence) corresponding to a particular combination of 1-bit values (0 or 1). The length of the index value may correspond to a number of pixels surrounding the particular pixel. The feature lookup table 152 may include an entry for each possible combination of the 1-bit values that form an index value. Each entry may include a feature flag that may be a 1-bit value (e.g., where a value of 0 is false and a value of 1 is true), which indicates whether or not the particular pixel is a feature corresponding to the pattern of 1-bit values of the index value. For FAST, the index value is based on a 16-bit sequence and the feature lookup table may have $2^{16}$ entries, each corresponding to an index value having a distinct sequence of 16 1-bit values. Each entry of the feature lookup table 152 may have an index value that has a 16-bit sequence, which is used to determine whether the 16-bit sequence indicates that the particular pixel is a feature. For example, an entry of the feature lookup table 152 may have a feature flag with a value of 1 (e.g. where a value of 1 is true) and an index that may be a 16-bit sequence corresponding to a pattern that includes at least 9 consecutive ones (when a value of one indicates that the feature determination criteria is satisfied) or 9 consecutive zeros (when a value of zero indicates that the feature determination criteria is satisfied).

In another particular embodiment, the table lookup operation may be used to determine whether a particular pixel is the feature by searching a feature lookup table 152 for a pattern representing the set of comparison results 138. In this embodiment, the feature lookup table 152 may include one or more entries, each entry identifying a pattern (e.g., bit sequence), that indicates that the particular pixel is a feature. For FAST, the feature lookup table 152 may include 16-bit sequences that include at least 9 consecutive ones (when a value of one indicates that the feature determination criteria is satisfied) or 9 consecutive zeros (when a value of zero indicates that the feature determination criteria is satisfied).

In implementations other than FAST, different entries may be stored in the feature lookup table 152. The feature lookup table 152 may be stored within memory of the computing device 110 or may be included in local storage associated with the processor, either of which may be accessible by the feature detection processor module 130 to perform the table lookup operation 150. Alternatively, the feature lookup table 152 may be included within the feature detection processor module 130, as shown in FIG. 1. A particular embodiment of the feature lookup table operation 150 is further illustrated with reference to FIGS. 3 and 4.

The feature identification instruction 160 may be a processor-executable instruction that, when executed by a processor, may cause the processor to determine whether the set of comparison results 138 indicates that the particular pixel used to generate the set of comparison results 138 is a feature. The feature identification instruction 160 may be a single microarchitected instruction that takes the set of comparison results 138 as an input parameter. The size of the input parameter may be equal to the size of the set of comparison results 138, which may be defined based on the plurality of pixels that are examined around the particular pixel.

Upon execution of the feature identification instruction 160 by a processor, the processor may analyze the input parameter associated with the feature identification instruction 160 to determine whether the particular pixel is a feature. For example, when feature detection is based on FAST using 16 surrounding pixels, the set of comparison results 138 may be processed to determine whether 9 or more contiguous comparison results of the set of comparison results 138 are equal to one (when a value of one indicates that the feature determination criteria is satisfied) or equal to zero (when a value of zero indicates that the feature determination criteria is satisfied). An example that illustrates execution of the feature identification instruction 160 is further described with reference to FIG. 6.

In a particular embodiment, the feature score processor module 140 may be configured to process one or more pixels of an image included in the image data 122 to determine whether a feature score may be associated with each of the one or more pixels that are features of the image. Alternatively, the feature score processor module 140 may receive an identification of feature pixel(s) 134 from the feature detection processor module 130 and may determine a feature score associated with the feature pixel(s) 134. The feature score may represent a "strength" of the feature, indicating a degree of difference between a particular pixel that is identified as a feature and a plurality of pixels that surround the particular pixel.

When the feature score processor module 140 receives the image data 122 instead of the feature pixel(s) 134, the feature score processor module 140 may initially perform a feature test (e.g., feature detection) to determine which particular pixels of the image data 122 are a feature. The feature test may be the same feature test as that implemented by the module 130 or may be a different feature test. Alternately, the feature score module 140 may rely on the feature detection processor module 130 for identifying features (e.g., by sending a feature test request 136).

After feature pixels are identified, the feature score processor module 140 may compute a feature score for one or more of the feature pixels. For example, pixels that are not features may be assigned a value (e.g. 0) that may indicate that the particular pixel did not quality as a feature based on the initial feature test. If the candidate pixel is identified as a feature, an additional feature test may be iteratively performed by modifying criteria (e.g., a threshold attribute value) that defines the feature before each feature test is performed. The additional feature test may be a feature test of any of the particular embodiments described herein. In one example, the threshold attribute value is incremented or decremented for each iteration. Feature tests may be iteratively performed with increasing or decreasing threshold values until the candidate pixel fails a feature test. The feature score for the candidate pixel may be defined based on the threshold attribute value used in the last passed iteration. For example, when the threshold attribute value is incremented each iteration, a feature pixel that passes more iterations will have a higher feature score (indicating a "stronger" feature) than a feature pixel that passes fewer iterations. A particular embodiment that illustrates how a feature score is calculated is further described with reference to FIG. 6.

In operation, the computing device 110 may receive the image data 122. The image data 122 may be received from one or more sources (not shown), which may include, but are not limited to, a camera, an input device, a computing device, or a combination thereof. The image controller 120 may handle receiving the image data 122 for the computing device 110. The image controller 120 may provide the image data 122 to the feature detection processor module 130, the feature score processor module 140, or both. The feature detection processor module 130 may process the image data 122 to determine whether one or more pixels of an image in the image data 122 are a feature of the image. In a particular embodiment, the feature detection processor module 130 may provide one or more feature pixels 134, which have been identified as a feature, to the feature score processor module 140 to determine a feature score. The feature score may be associated with each feature identified for each of the one or more feature pixels 134. The feature score processor module 140 may process one or more additional pixels of the image data 122 to determine a feature score for the one or more additional pixels (e.g., including assigning a feature score of zero to pixels other than the feature pixels 134). Particular embodiments of the system 100 may be utilized to perform feature detection, to determine a feature score, or both.

Thus, the system 100 of FIG. 1 may enable performing feature detection using a table lookup operation or a processor executable instruction to determine whether a particular pixel is a feature, which may reduce (e.g., by approximately 20%) an amount of processing performed for feature detection. In addition, the system 100 of FIG. 1 may enable computing a feature score that indicates a strength of a feature, which may improve accuracy in identifying features of an image.

Figure 2:
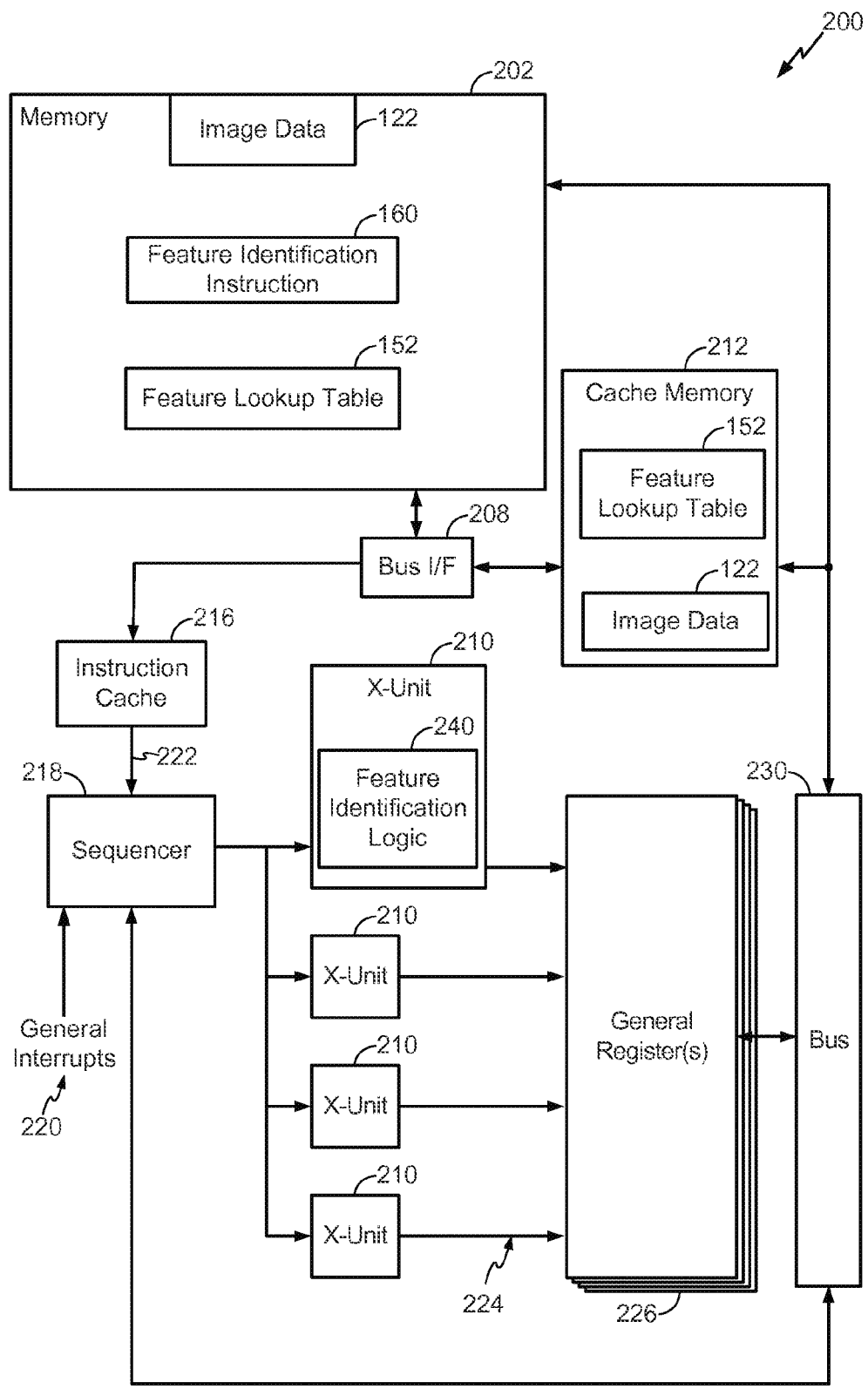
FIG. 2 is a block diagram of another particular embodiment of a system to determine whether a pixel of an image is a feature and to determine a score associated with the feature.

Referring to FIG. 2, another particular embodiment of a system to determine whether a pixel of an image is a feature and to determine a score associated with the feature is depicted and generally designated 200.

The system 200 includes a memory 202 (e.g., random access memory (RAM)) that may be coupled to a cache memory 212 via a bus interface 208. In a particular embodiment, all or a portion of the system 200 may be integrated into a processor. Alternatively, the memory 202 may be external to the processor. The memory 202 may store the image data 122 of FIG. 1. The memory 202 may also store the feature lookup table 152 of FIG. 1 and/or the feature identification instruction 160 of FIG. 1. In a particular embodiment where all or a portion of the system 200 may be integrated into a processor, the cache memory 212 may be integrated as local cache integrated within the processor. During operation, the cache memory 212 may store all or a portion of the image data 122 and/or the feature lookup table 152.

An instruction cache 216 may also be coupled to the memory 202 via the bus interface 208. The instruction cache 216 may be coupled to a sequencer 218 via a bus 222. The sequencer 218 may receive general interrupts 220, which may be retrieved from an interrupt register (not shown). In a particular embodiment, the instruction cache 216 may be coupled to the sequencer 220 via a plurality of current instruction registers (not shown), which may be coupled to the bus 222 and associated with particular threads (e.g. hardware threads) of the system 200 integrated within a processor. In a particular embodiment, the system 200 may be a processor that supports simultaneous and/or concurrent multi-threaded processing. In a particular embodiment, the bus 222 may be a one-hundred and twenty-eight bit (128-bit) bus and the sequencer 218 may be configured to retrieve one or more of the instructions 204 from the memory 202 via instruction packets having a length of thirty-two (32) bits each. The sequencer 218 may be coupled to one or more execution units 210, such as each of the execution units 210. Each of the execution units 210 may be coupled to a general register file 226 via bus 224. The general register file 226 may also be coupled to the sequencer 218, the cache memory 212, and the memory 202 via the bus 230.

In a particular embodiment, one or more of the execution units 210 may include feature identification logic 240 that may be used during execution of the feature identification instruction 160. A particular embodiment of the feature identification logic 240 is further described with reference to FIG. 5.

In a particular embodiment, the system 200 may concurrently process one or more pixels of an image to determine whether each of the one or more pixels is a feature. For example, each of the one or more execution units 210 may each be able to perform methods or functions of the feature detection processor module 130, such as described with reference to FIGS. 1, 3-5, 7, 8, and 10. Alternately, or in addition, the system 200 may concurrently process one or more pixels of an image to determine a feature score for each of the one or more pixels. For example, each of the one or more execution units 210 may each be able to perform methods or functions of the feature score processor module 140 of FIG. 1, such as described with reference to FIGS. 1, 6, 9, and 10.

In a particular embodiment, the system 200 may support vector processing operations that are performed to process pixels of an image to determine whether a pixel is a feature of the image. For example, the system 200 may perform vector processing operations to compare a particular pixel to each of a plurality of pixels that surround the particular pixel. The data corresponding to each of the plurality of pixels may be received in a vector format that supports the vector processing operations (or instructions) executable by a vector processor. For example, the data may be received in one or more vector data structures, each of which may contain attribute information one or more pixels. In another example, each vector data structure may correspond to a particular row of the image and may contain the data corresponding one or more pixels of the particular row. Parallel processing may be performed when data corresponding to each of the plurality of pixels are in a vector format.

In a particular embodiment, the system 200 may support a first-in-first-out (FIFO) byte load instruction that may enable vector data (e.g., two 9-pixel vectors) to be generated for each of the plurality of pixels that surround a candidate pixel. Such an instruction may increase efficiency in performance of feature detection with respect to obtaining data associated with each of the plurality of pixels. The instruction may accept an input of 8 bytes and may shift each of the bytes by one element. The vacated position may be filled with another byte loaded from memory. The instruction may be beneficial for use in delay lines in filters and/or arranging a sequence of bytes.

In another particular embodiment, the system 200 may support concurrent processing of one or more pixels of an image that are identified as a feature to determine a feature score associated with each such feature. For example each of the execution units 210 may concurrently determine a feature score for a different feature pixel.

Figure 3:
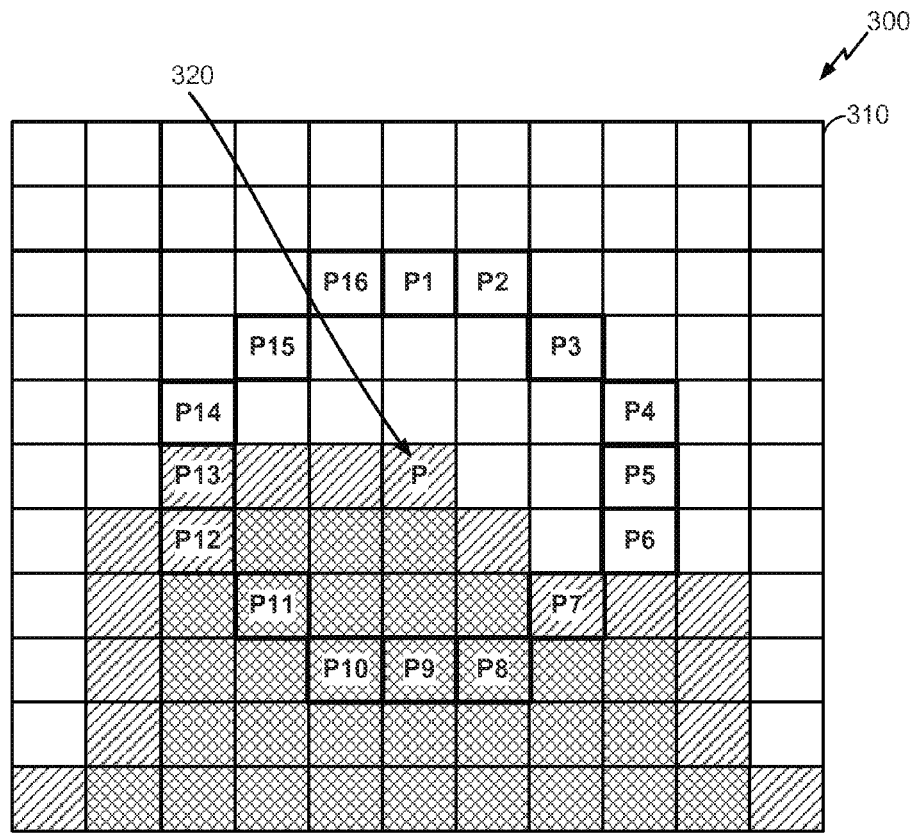
FIG. 3 is a diagram depicting a first illustrative example of determining whether a pixel of an image is a feature.
Figure 3:
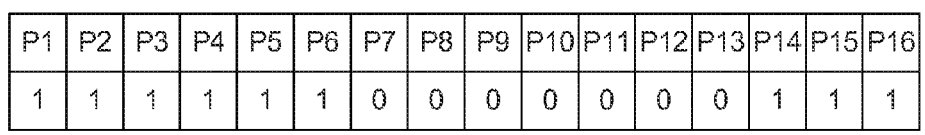
Figure 3:
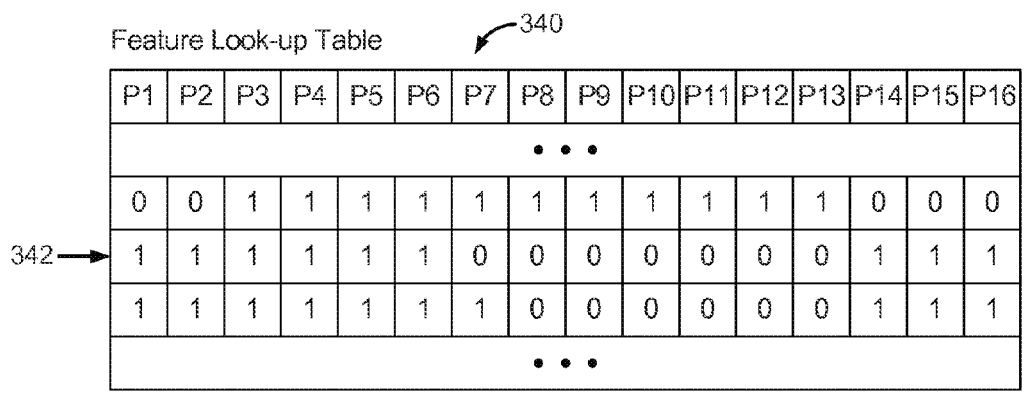

Referring to FIG. 3, a diagram 300 of a first illustrative example of determining whether a pixel of an image is a feature is illustrated. For example, the determination may be made by the feature detection processor module 130 of FIG. 1. A grid 310 of the diagram 300 represents pixels of an image that includes a candidate pixel (P) 320 (also referred to as a "pixel under test") and a plurality of pixels P1-P16 surrounding the pixel 320. In an illustrative embodiment, the grid 310 is a portion of the image data 122 of FIG. 1. In this example, the determination of whether the pixel 320 of the grid 310 is a feature is based on FAST-type feature detection.

A feature detector (e.g., the feature detection processor module 130 of FIG. 1) may determine whether the pixel 320 of an image is a feature by comparing of an attribute (e.g., intensity) of each of the plurality of pixels (P1-P16) to a comparison value of the pixel 320. For example, the comparison value may be defined based on the intensity of the pixel 320 and an adjustable intensity threshold.

In FIG. 3, the intensity of the pixel 320 and each of the plurality of pixels (P1-P16) may be within a range of values 0-10, where a value of 0 may indicate lowest intensity illustrated by a white pixel background and a value of 10 may indicate highest intensity illustrated by a solid black pixel background. A diagonal grid pixel background (e.g., P8-P11) may have a value of 6. A diagonal striped pixel background that has white dots (e.g. pixel 320. P7, P12, and P13) may have a value of 8. In FIG. 3, the pixel 320 may have a value of 8. Although an intensity range of 0-10 is described for clarity of explanation, other ranges of intensity values (e.g., 0-255) may be used.

A set of comparison results 330 associated with the plurality of pixels (P1-P16) may be determined, where each comparison result corresponds to one of the surrounding pixels (P1-P16) and indicates a result of comparing the intensity value of the surrounding pixel to the comparison value associated with the pixel 320. In a particular embodiment, the comparison value of pixel 320 may be defined based on the intensity attribute value (p) of the pixel 320 (e.g., 8) and a threshold intensity (e.g., 2). The set of comparison results 330 may be the set of comparison results 138 of FIG. 1.

Each comparison result may be a logic value (e.g., 0 or 1). For example, a value of 0 may indicate that the intensity of the corresponding surrounding pixels (P1-P16) does not differ from intensity of the pixel 320 (e.g. 8) by at least the threshold intensity (e.g., 2). That is, a value of 0 may indicate that the intensity of the surrounding pixel is greater than or equal to 6 and less than or equal to 10. A value of 1 may indicate that an intensity of a pixel of the plurality of pixels (P1-P16) is less than 6 or greater than 10. The pixel 320 may be identified as the feature when at least 9 pixels (P1-P6 and P14-P16) have a comparison value of 1. The example shown in FIG. 3 illustrates that the pixel 320 is a feature because at least 9 consecutive pixels (P1-P6 and P14-P16) have an intensity (i.e., 0) that differs from the intensity of the pixel 320 (i.e., 8) by at least the threshold intensity of 2.

In a particular embodiment, the comparison value for the pixel 320 may be defined as a maximum value based on a sum of the attribute value (p) of the pixel 320 and the threshold attribute (b) value (e.g., p+b). In FIG. 3, the comparison value for pixel 320 may have a maximum value of 10 when the intensity (p) of the pixel 320 is 8 and the intensity threshold (b) is 2. When the comparison value is defined as the maximum value, a comparison result may have a value of 1 when the corresponding surrounding pixel has an intensity greater than 10. Equation 1 illustrates this condition:

$$\text{Comparison Result}_{P(N)} = \begin{cases} 1, & \text{if } (p+b) < P(N) \\ 0, & \text{if } (p+b) >= P(N), \end{cases} \quad [\text{Equation 1}]$$

where $P(N)$ represents an attribute value of a surrounding pixel $(N)$.

In another particular embodiment, the comparison value for the pixel 320 may be defined as a minimum value, based on a difference of the attribute value (p) of the pixel 320 and the threshold attribute (b) value (e.g., p-b). In FIG. 3, the comparison value for pixel 320 may have a minimum value of 6 when the intensity (p) of the pixel 320 is 8 and the intensity threshold (b) is 2. When the comparison value is defined as the minimum value, a comparison result may have a value of 1 when the corresponding surrounding pixel has an intensity less than 6. Equation 2 illustrates this condition:

$$\text{Comparison Result}_{P(N)} = \begin{cases} 1, & \text{if } P(N) < (p-b) \\ 0, & \text{if } P(N) >= (p-b), \end{cases} \quad [\text{Equation 2}]$$

where $P(N)$ represents an attribute value of a surrounding pixel $(N)$.

In another particular embodiment, the comparison result may be determined based on two comparison values for the pixel 320: a first comparison value defined by the maximum value (p+b) and a second comparison value defined by the minimum value (p−b). In FIG. 3, based on the intensity of pixel 320, the pixel 320 may have a minimum value of 6 and a maximum value of 10. When two comparison values are defined based on the maximum and the minimum value, the comparison result may have a value of 1 when a pixel of the plurality of pixels (P1-P16) is less than 6 or greater than 10, and a value of 0 when the pixel is greater than or equal to 6 and less than or equal to 10. Equation 3 illustrates this condition:

$$\text{Comparison Result}_{P(N)} = \begin{cases} 1, & \text{if } P(N) < (p-b) \| ((p+b) < P(N)) \\ 0, & \text{if } (p-b) <= P(N) <= (p+b), \end{cases}$$ [Equation 3]

where $P(N)$ represents an attribute value of a surrounding pixel $(N)$.

In the example in FIG. 3, the set of comparison results 330 are generated based on Equation 3. Based on the set of comparison results 330, a determination can be made whether the pixel 320 is a feature of the image. For example, when FAST-type feature detection is used, the set of comparison results 330 may indicate that the pixel 320 is a feature when at least nine contiguous comparison results have a value of 1. In a particular embodiment, a table lookup operation (e.g., the table lookup operation 150 of FIG. 1) may be performed to determine whether the set of comparison results 330 has at least nine consecutive ones.

In a particular embodiment, the table lookup operation may include performing a comparison of the set of comparison results 330 to one or more entries of a feature lookup table 340. The feature lookup table 340 represents an example of the feature lookup table 152 of FIG. 1. Each entry of the feature lookup table 340 represents a set of comparison results that indicates that the pixel used to generate the set of comparison results is a feature.

In the example of FIG. 3, the pixel 320 may be determined to be a feature because an entry 342 in the feature lookup table 340 matches the set of comparison results 330.

Figure 4:
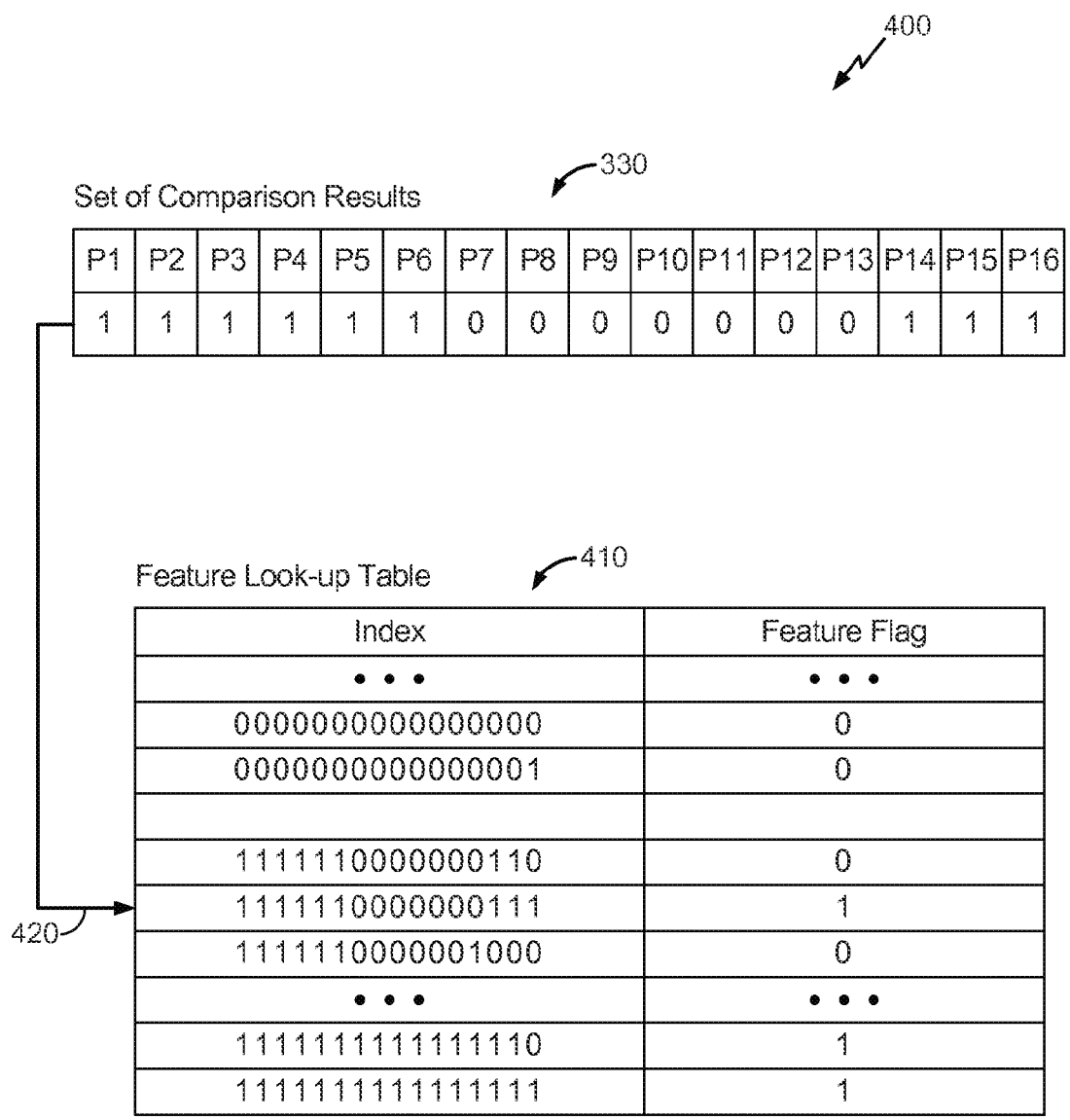
FIG. 4 is a diagram depicting a second illustrative example of determining whether a pixel of an image is a feature.

Referring to FIG. 4, a diagram 400 illustrates a second illustrative example of determining whether a pixel of an image is a feature. The feature lookup table 410 of FIG. 4 represents another example of the feature lookup table 152 of FIG. 1. In an alternative embodiment, the table lookup operation may include using the set of comparison results 330 of FIG. 3 as an index to locate an entry within the feature lookup table 410 in FIG. 4 to determine whether the pixel 320 of FIG. 3 is a feature. Each entry of the feature lookup table 410 may have an index value that is based on a pattern of 16 1-bit values corresponding to a potential set of comparison results. A feature flag associated with each index value indicates whether the pattern identifies a feature. In the example of FIG. 4, the pixel 320 may be determined to be a feature because the set of comparison results 330 matches an index value at entry 420 within the feature lookup table 410. The entry 420 in the feature lookup table 410 has a feature flag with a value of 1 that indicates that the pattern identifies a feature.

Figure 5:
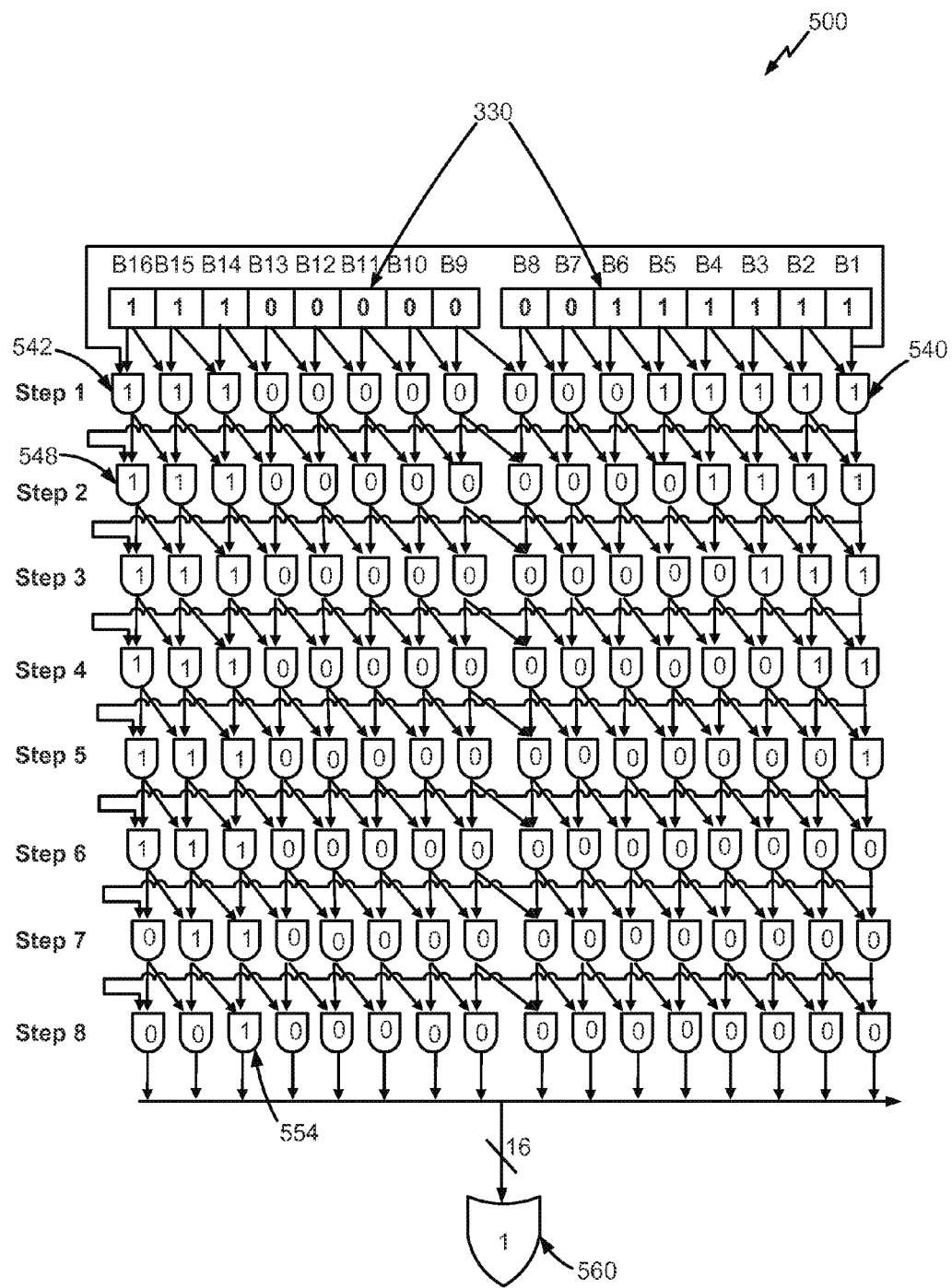
FIG. 5 is a diagram depicting a third illustrative example of determining whether a pixel of an image is a feature.

Alternately, instead of using a table lookup operation, a feature identification instruction (e.g., the instruction 160 of FIG. 1) may be used to determine whether the set of comparison results 330 includes at least 9 consecutive ones. Referring to FIG. 5, a diagram 500 illustrates operation of the feature identification instruction 160 of FIG. 1 to determine whether the pixel 320 of FIG. 3 is a feature by determining whether the set of comparison results 330 of FIG. 3 includes at least 9 consecutive ones. In a particular embodiment, the logic depicted in FIG. 5 is included in a circuit implementation in the feature identification logic 240 of FIG. 2.

The feature identification instruction may process an input parameter to determine whether the input parameter has a subset of contiguous 1-bit values, each having a value of 1. The length of the subset may be configurable, and may be set to 9 when implementing FAST-type feature detection. It should be noted that although operation of the feature identification instruction is described in the context of image processing, such an instruction may also be used for other computing operations that involve determining whether a set has subset of matching values and determining whether the subset has a number of elements that exceeds a threshold number of elements (e.g., a threshold subset size). When used for image processing, each 1-bit value input to the instruction may correspond to a result of a comparison of one of the pixels surrounding a candidate pixel to a comparison value. In the example shown in FIG. 5, the feature identification instruction is performed with the set of comparison results 330 of FIG. 3 as the input parameter.

In a particular embodiment, the feature identification instruction may be performed by using 16 two-input AND-logic gates. In FIG. 5, a result of the AND logic operation performed by each of 16 AND-logic gates is shown within the AND-logic gate. During execution of the feature identification instruction, a series of iterative operations using the 16 AND-logic gates may be performed, as illustrated by Steps 1-8 in FIG. 5. It should be noted that although 16×8=128 AND-logic gates are shown in FIG. 5, Steps 1-8 may instead be performed using one set of 16 AND-logic gates (e.g., where one of the inputs for each successive step is generated by a shifter). The number of steps may vary based on how many contiguous values are to be identified within the input parameter. The number of steps performed for the feature identification instruction (e.g., 160 of FIG. 1) may be one less than the number of contiguous values that are to be identified. For example, the example in FIG. 5 is based on 8 steps because 9 contiguous values are to be identified from the input parameter. When at least one of the 16 AND-logic gates has a resulting value of 1 after Step 8 is performed, the candidate pixel (e.g., the pixel 320 of FIG. 3) is identified as a feature. This determination can be obtained by feeding the resulting values into a 16-input OR-logic function. For example, the resulting value from each of the 16 AND-logic gates at Step 8 may be fed into a 16-input OR-logic gate 560, which produces a resulting value of 1 because AND-logic gate 554 at Step 8 has an output value of 1.

At Step 1, each bit (B1-B16) of the input parameter (e.g., the set of comparison results 330 of FIG. 3) is provided as input to one of the 16 AND-logic gates (e.g., 540). Each bit (B1-B16) corresponds to a particular pixel P1-P16 of the set of comparison results 330 associated with the surrounding pixels (P1-P16). For example, an AND operation is performed between B16 and B1 at a leftmost AND-logic gate 542 and between B1 and B2 at a right most AND-logic gate 540. At the end of Step 1, each AND-logic gate that outputs a value of one may indicate that a subset of 2 contiguous ones exists in the set of comparison results 330.

At Step 2, the results determined in Step 1 are used to perform another set of 16 AND operations by comparing each result produced by an AND-logic gate in Step 1 to each adjacent result produced by an adjacent AND-logic gate in Step 1. For example, a result from the AND-logic gate 540 is compared with a result from the AND-logic gate 542 by an AND-logic gate 548. At the end of Step 2, each AND-logic gate that outputs a value of one may indicate that a subset of 3 contiguous ones exists in the set of comparison results 330.

Steps 3-8 in FIG. 5 may be performed in a similar manner. At the end of Step 8, each AND-logic gate that outputs a value of one may indicate that a subset of 9 continuous ones exists in the set of comparison results. Thus, the feature identification instruction may determine that the pixel 320 is a feature because an AND-logic gate 554 has an output value of 1.

Figure 6:
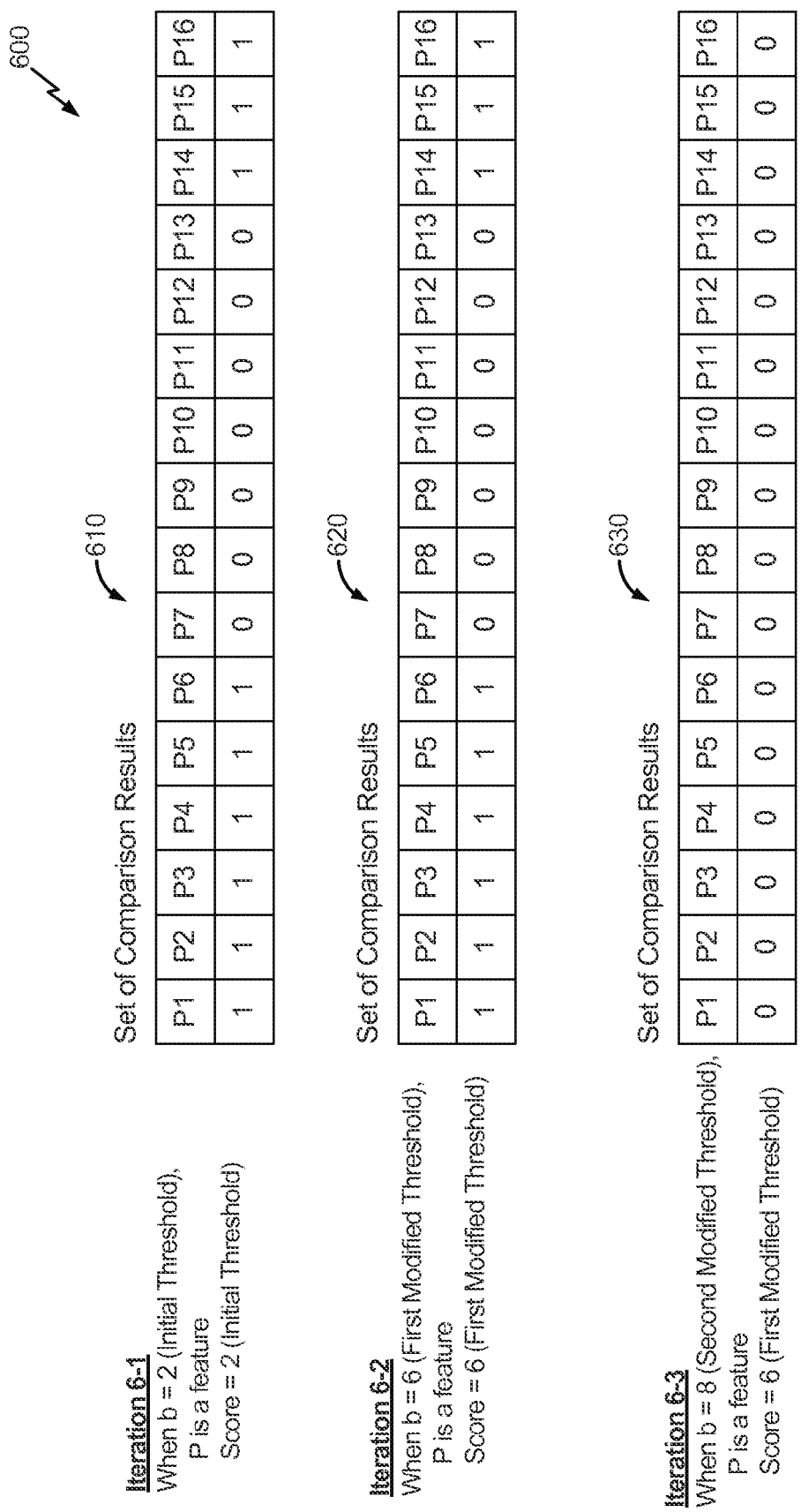
FIG. 6 is a diagram depicting an illustrative example of determining a score associated with a pixel of an image identified as a feature.

Referring to FIG. 6, a diagram 600 depicts a first illustrative example of determining a score associated with a feature identified for a pixel of an image. For example, the determination of the score may be made by the feature score processor module 140 of FIG. 1. In particular, the diagram 600 illustrates how a feature score may be determined for a feature associated with the pixel 320 of FIG. 3.

At Iteration 6-1, a feature test (e.g., feature detection) may be performed to determine whether the pixel 320 of FIG. 3 is a feature of an image. In the example illustrated in FIG. 6, the feature test may be defined based on a first comparison value defined by a minimum value of 6 and a second comparison value defined by a maximum value of 10, and based on an initial threshold intensity of 2. Based on the Equation 3, a first set of comparison results 610 for the surrounding pixels (P1-P16) may be generated. The feature test in the first iteration may determine that the pixel 320 of FIG. 3 is a feature because the first set of comparison results 610 includes at least 9 contiguous comparison results of the set of comparison results having a value of 1. After determining that the pixel 320 of FIG. 3 is a feature at Iteration 6-1, a feature score may be determined for the feature identified for the pixel 320 of FIG. 3. The feature score may be defined based on the threshold intensity (b). For example, the feature score for Iteration 6-1 may be equal to 2 because the initial threshold intensity is 2.

To determine the strength of the feature, one or more additional feature tests may be performed on the pixel 320 of FIG. 3 in subsequent iterations. Each subsequent iteration may be based on a particular modified threshold intensity value that increases or decreases for a particular additional feature test. The one or more additional feature tests may be each be performed until the pixel 320 of FIG. 3 is not identifiable as a feature. In a particular embodiment, the feature score may be defined based on the modified threshold value of the last successful particular additional feature test that indicates that the pixel 320 of FIG. 3 is a feature.

For example, Iteration 6-2 of FIG. 6 shows a second set of comparison results 620 produced by a second feature test using a modified threshold intensity of 6, which results in a minimum value of 2 and a maximum value of 14. The pixel 320 of FIG. 3 remains identifiable as a feature based on the second set of comparison results 620, because the second set of comparison results includes at least 9 consecutive ones. However, the feature score may be changed to 6 because the candidate pixel passed a feature test using the modified threshold intensity if 6. Moreover, because the candidate pixel remained identifiable as a feature during Iteration 6-2, another iteration (Iteration 6-3) may be performed.

Iteration 6-3 of FIG. 6 shows a third set of comparison results 630 produced using a threshold intensity of 8, which results in a minimum value of 0 and a maximum value of 16. The pixel 320 of FIG. 3 is no longer identified as a feature based on the third set of comparison results 630. Thus, the pixel 320 of FIG. 3 is distinguished as a feature based on intensity with a feature score of 6. The feature score indicates that at least 9 contiguous surrounding pixels differ from the pixel 320 of FIG. 3 by an intensity of 6.

To determine a feature score that reflects a maximum threshold intensity, one or more subsequent iterations may be performed by decrementing the modified threshold intensity of 8 until the pixel 320 of FIG. 3 is identified as a feature. In the example of FIG. 6, an additional feature test may be performed using a modified threshold intensity of 7 because the pixel 320 of FIG. 3 is identified as a feature based on a modified threshold intensity of 6 and cannot be identified as a feature based on the modified threshold intensity of 8. The pixel 320 of FIG. 3 may be identified as a feature based on an additional feature test using the modified threshold intensity of 7. The additional feature test produces a set of comparison results similar to the second set of comparison results 620. The feature score may be changed to 7 because the candidate pixel passed a feature test using the modified threshold intensity if 7. A feature score of 7 represents a maximum threshold intensity that identifies the pixel 320 of FIG. 3 as a feature.

Figure 7:
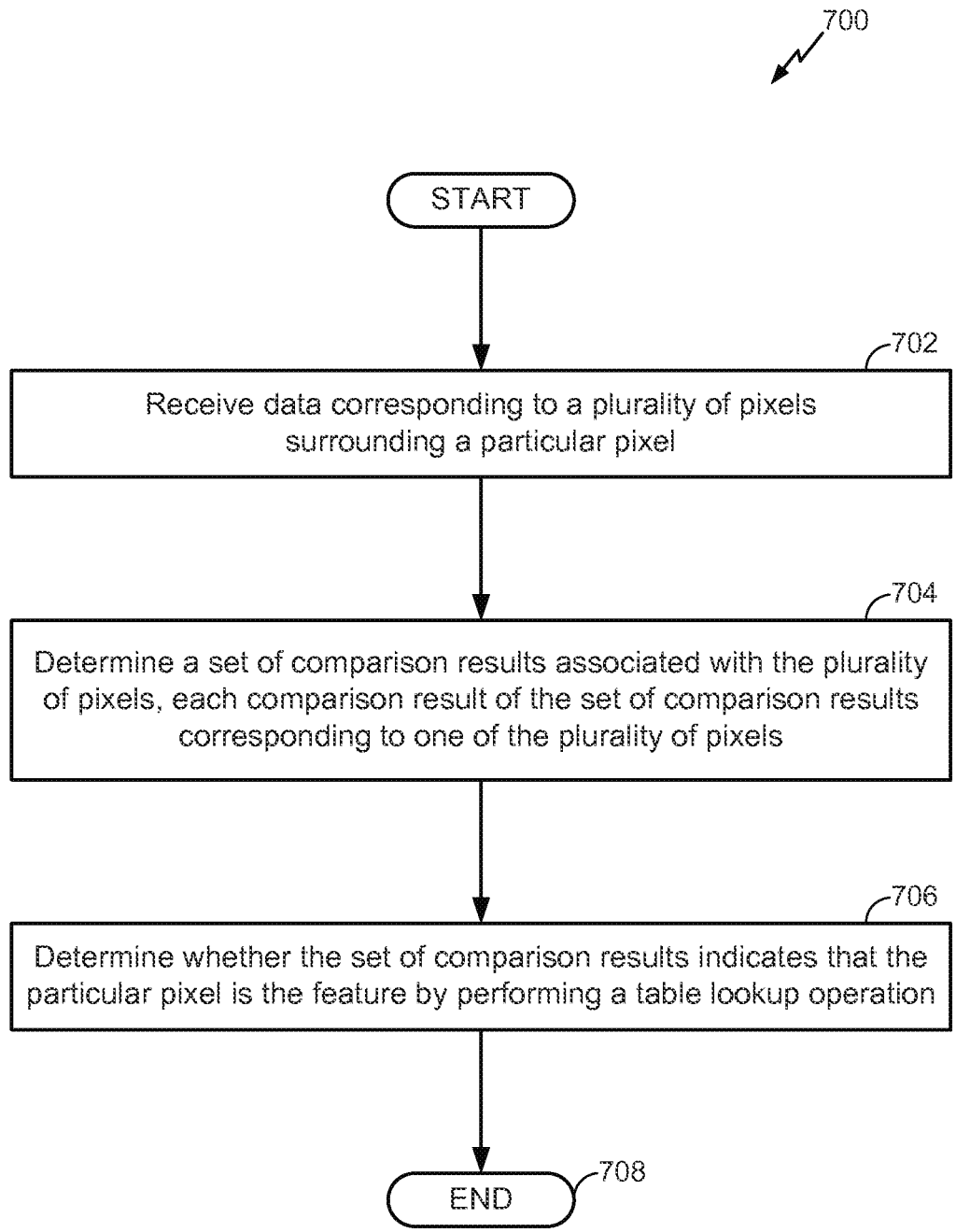
FIG. 7 is a flow chart of a first particular embodiment of a method to determine whether a pixel of an image is a feature.

Referring to FIG. 7, a first embodiment of a method to determine whether a pixel of an image is a feature is depicted and generally designated 700. The method 700 may be performed by the feature detection processor module 130 of FIG. 1. The method 700 may be performed by all or part of the system 200.

At 702, the method 700 includes receiving data corresponding to a plurality of pixels that surround a particular pixel of an image. For example, the feature detection processor module 130 of FIG. 1 may receive data corresponding to a plurality of pixels that surround a particular pixel of an image. The data corresponding to the plurality of pixels may be received by the feature detection processor module 130 of FIG. 1 as a portion of the image data 122 of FIG. 1. The data may include attribute information (e.g., intensity, luminescence, hue, chromaticity, brightness, saturation, etc.) corresponding to each of the plurality of pixels.

At 704, the method 700 includes determining a set of comparison results associated with the plurality of pixels. For example, the feature detection processor module 130 of FIG. 1 may determine the set of comparison results 138 of FIG. 1. Each comparison result of the set of comparison results may correspond to one of the plurality of pixels and may indicate a result of comparing an attribute value (e.g., intensity, luminescence, hue, chromaticity, brightness, saturation, etc.) corresponding to the one of the plurality of pixels to a comparison value. For example, the set of comparison results may be determined based on Equation 1, Equation 2, or Equation 3.

At 706, the method 700 includes determining whether the set of comparison results indicates that the particular pixel is the feature by performing a table lookup operation using the set of comparison results as an index. For example, the feature detection processor 130 of FIG. 1 may determine whether the set of comparison results 138 of FIG. 1 indicates that the particular pixel is the feature by performing the table lookup operation 150 of FIG. 1. In an illustrative embodiment, the table lookup operation 150 of FIG. 1 may be performed as described with reference to FIGS. 3 and 4. The method 700 ends at 708.

Figure 8:
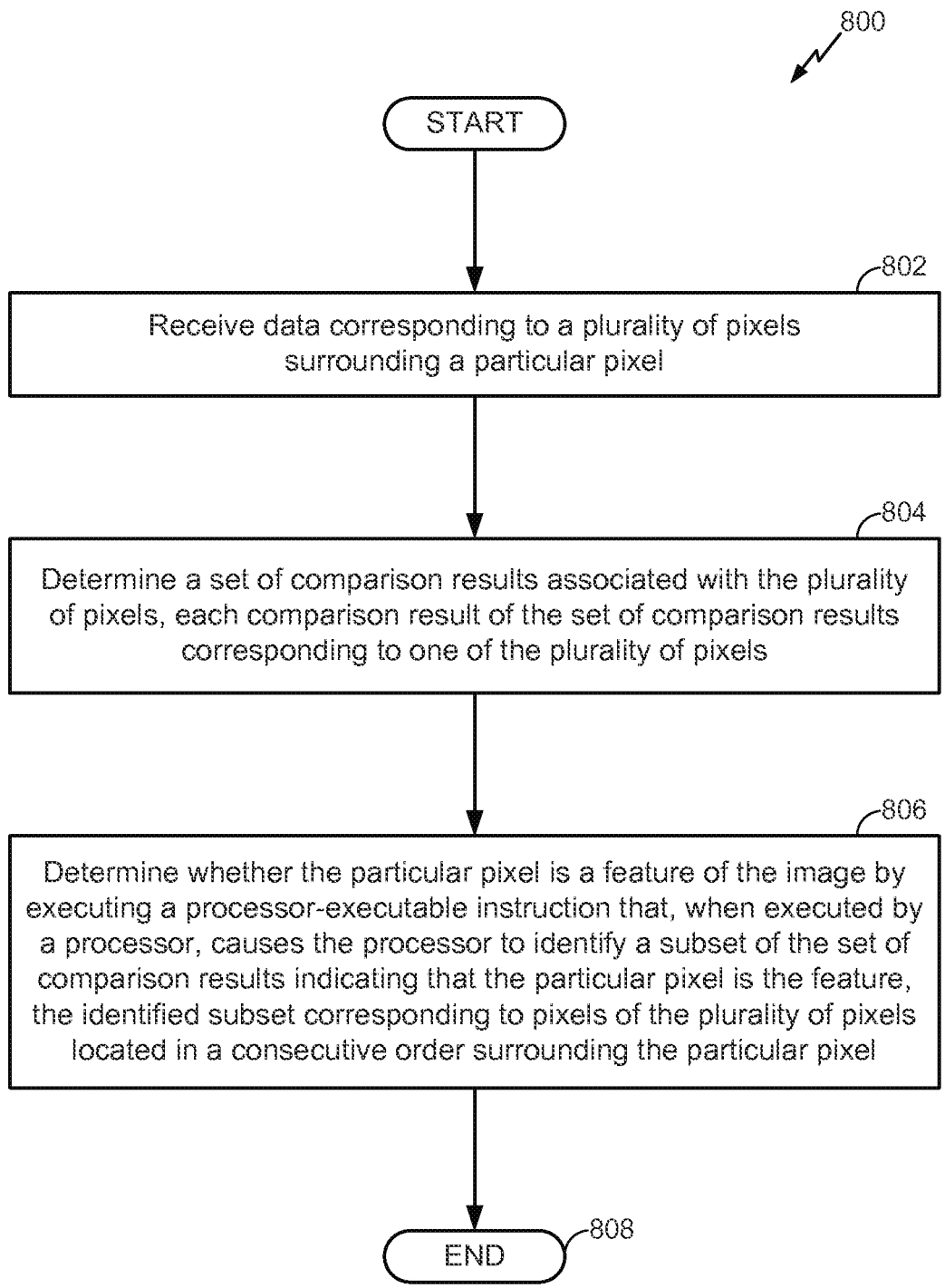
FIG. 8 is a flow chart of a second particular embodiment of a method to determine whether a pixel of an image is a feature.

Referring to FIG. 8, a second embodiment of a method to determine whether a pixel of an image is a feature is depicted and generally designated 800. The method 800 may be performed by the feature detection processor module 130 of FIG. 1. The method 800 may be performed by all or part of the system 200.

At 802, the method 800 includes receiving data corresponding to a plurality of pixels that surround a particular pixel of an image. For example, the feature detection processor module 130 of FIG. 1 may receive data corresponding to a plurality of pixels that surround a particular pixel of an image. The data corresponding to the plurality of pixels may be received by the feature detection processor module 130 of FIG. 1 as a portion of the image data 122 of FIG. 1. The data may include attribute information (e.g., intensity, luminescence, hue, chromaticity, brightness, saturation, etc.) corresponding to each of the plurality of pixels.

At 804, the method 800 includes determining a set of comparison results associated with the plurality of pixels. For example, the feature detection processor module 130 of FIG. 1 may determine the set of comparison results 138 as described with respect to FIG. 1.

At 806, the method 800 includes determining whether the particular pixel of the image is a feature by executing a processor-executable instruction that, when executed by a processor, causes the processor to identify a subset of the set of comparison results indicating that the particular pixel is the feature. For example, the feature detection processor 130 of FIG. 1 may determine whether a particular pixel of an image is a feature of the image by performing the feature identification instruction 160 of FIG. 1. In an illustrative embodiment, the feature identification instruction 160 of FIG. 1 may be performed using a set of 16 AND-logic gates, such as described with reference to FIG. 5. The method 800 ends at 808.

Figure 9:
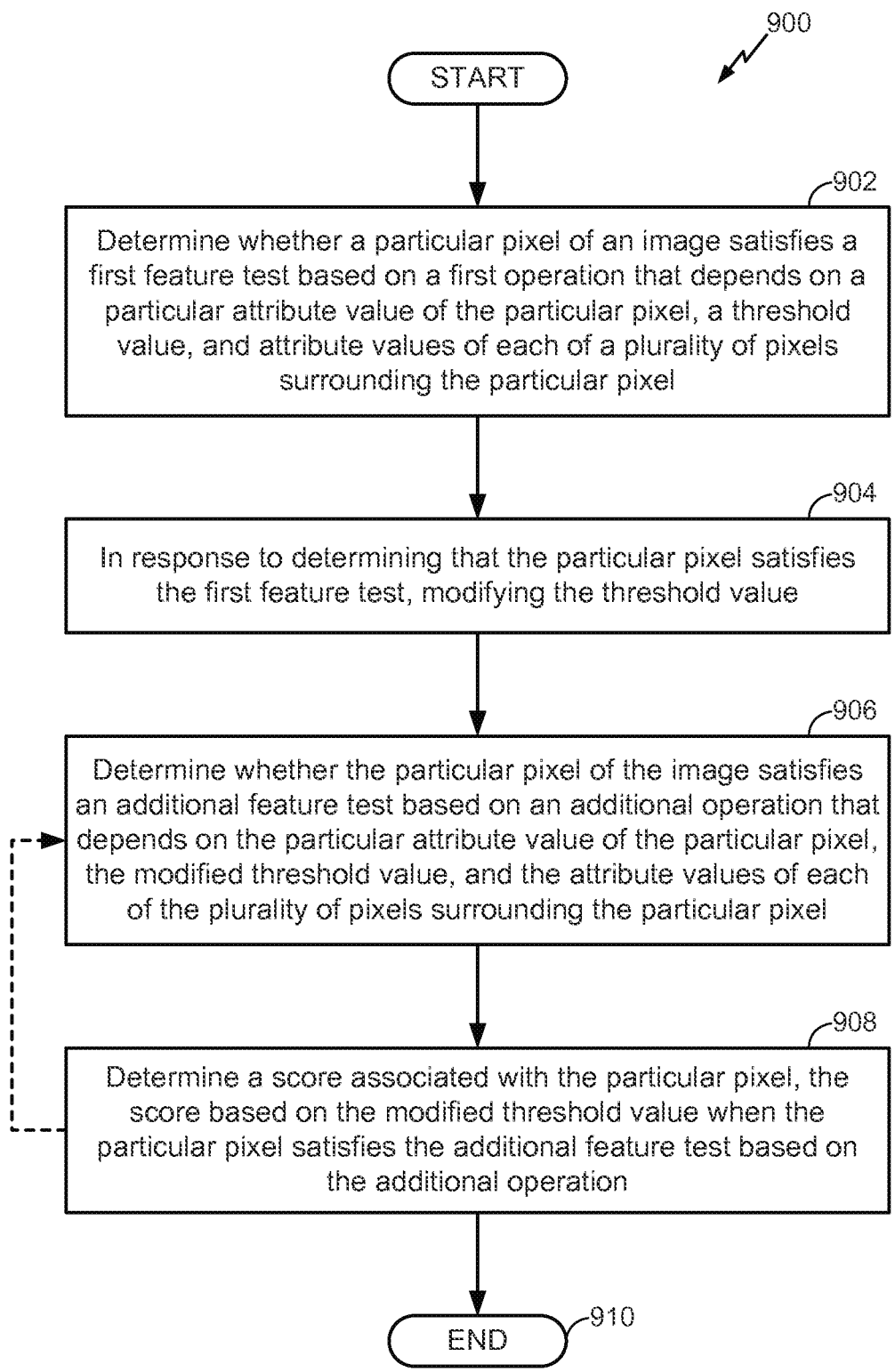
FIG. 9 is a flow chart of a particular embodiment of a method to determine a score associated with a pixel of an image identified as a feature.

Referring to FIG. 9, a particular embodiment of a method to determine a score associated with a feature identified for a pixel of an image is depicted and generally designated 900. The method 900 may be performed by the feature score processor module 140 of FIG. 1. The method 900 may be performed by all or part of the system 200.

At 902, the method 900 includes determining whether a particular pixel of an image satisfies a first feature test based on a first operation that depends on a particular attribute value of the particular pixel, a threshold value, and attribute values of each of a plurality of pixels surrounding the particular pixel. For example, the first feature test may be performed according to the method 700 of FIG. 7, the method 800 of FIG. 8, or a combination thereof, which may determine whether a particular pixel is a feature based on an initial threshold value. In a particular embodiment, the feature score processor module 140 of FIG. 1 may send the feature test request 136 of FIG. 1 to the feature detection processor module 130 of FIG. 1 to determine whether particular pixel is a feature. The first feature test may include performing FAST-type feature detection. For example, the feature score processor module 140 of FIG. 1 may perform the feature test as described with reference to FIG. 6 by generating the first set of comparison results 610. A table lookup operation (e.g., the table lookup operation 150 of FIG. 1) may be performed on the first set of comparison results 610 to determine whether the first set of comparison results 610 includes at least 9 consecutive ones. Alternatively, the feature identification instruction 160 of FIG. 1 may be performed to determine whether the first set of comparison results includes at least 9 consecutive ones.

At 904, the method includes modifying the threshold value in response to determining that the particular pixel satisfies the first feature test. For example, the feature score processor module 140 of FIG. 1, in response to determining that the particular pixel is a feature based on the first feature test, may modify the threshold value that was used during the first feature test. The threshold value may be modified as described with reference to Iteration 6-2 of FIG. 6.

At 906, the method includes determining whether the particular pixel of the image satisfies an additional (e.g., a second, a third, and a fourth) feature test based on an additional (e.g., a second, a third, and a fourth) operation that depends on the particular attribute value of the particular pixel, the modified threshold value, and the attribute values of each of the plurality of pixels surrounding the particular pixel. For example, the additional feature test may be performed as described with reference to Iteration 6-2 of FIG. 6. The second set of comparison results 620 may be processed (e.g., by performing a table lookup or by performing a feature identification instruction) to determine whether the particular pixel remains identifiable as a feature. In a particular embodiment, the modified threshold value may be defined based on an estimated maximum threshold value such that the particular pixel may be identifiable as a feature.

At 908, the method 900 includes determining a score associated with the particular pixel, where, when the particular pixel satisfies the additional feature test (e.g., second feature test) based on the additional operation (e.g., the second operation), the score is based on the modified threshold value. For example, when the particular pixel passes the additional feature test, the feature score processor module 140 of FIG. 1 may determine a feature score associated with the particular pixel based on the modified threshold value. To illustrate, because the candidate pixel passes the second feature test in Iteration 6-2 of FIG. 6, the feature score may be equal to the modified threshold value of 6 instead of the initial threshold value of 2. The method 900 ends at 910.

In a particular embodiment, the method 900 may return to 906 to perform the additional feature test based on further modification of a previous modified threshold value. For example, when the modified threshold value is based on an estimated maximum threshold value, the method may return to 906 to perform the additional feature test using a further modified threshold value that is less than the estimated maximum threshold value. The modified threshold value may be further modified by choosing a new modified threshold value based on a binary search algorithm. The new modified threshold value may be identified as a value that is between the previous modified threshold value and the initial threshold value. At 908, the method determines the score associated with the particular pixel when the particular pixel satisfies the additional feature test based on the further modified threshold value. The score may be determined based on the further modified threshold value when the particular pixel is identified as a feature. The score may represent the maximum threshold value after one or more additional tests are performed for the modified threshold value.

In another particular embodiment, when the particular pixel satisfies the additional feature test, the method may return to 906 to perform the additional feature test to determine a more accurate score. For example, the method may return to 906 to perform the additional feature test based on a further modified threshold value that is increased to determine whether the particular pixel remains identifiable as a feature. At 908, if the particular pixel satisfies the additional feature test based on the further modified threshold value, then the score for the particular pixel is based on the further modified threshold value corresponding to the additional feature test.

For example, the additional feature test may be a feature test performed at Iteration 6-3 of the example illustrated in FIG. 6 using a further modified threshold value of 8. Because the additional feature test performed at Iteration 6-3 indicates that the candidate pixel (i.e., the pixel 320 of FIG. 3) is not a feature (according to the threshold value of 8), the feature score remains equal to 6 instead of being updated to equal the further modified threshold value of 8. Because the pixel 320 of FIG. 3 is not a feature based on the further modified threshold value of 8, the additional feature test may be performed using a modified threshold intensity of 7 because the pixel 320 of FIG. 3 is identified as a feature based on a modified threshold intensity of 6 and cannot be identified as a feature based on the modified threshold intensity of 8. The pixel 320 of FIG. 3 may be identified as a feature based on an additional feature test using the modified threshold intensity of 7. The feature score may be changed to 7 because the candidate pixel passed a feature test using the modified threshold intensity if 7. A feature score of 7 represents the maximum threshold intensity that identifies the pixel 320 of FIG. 3 as a feature.

Figure 10:
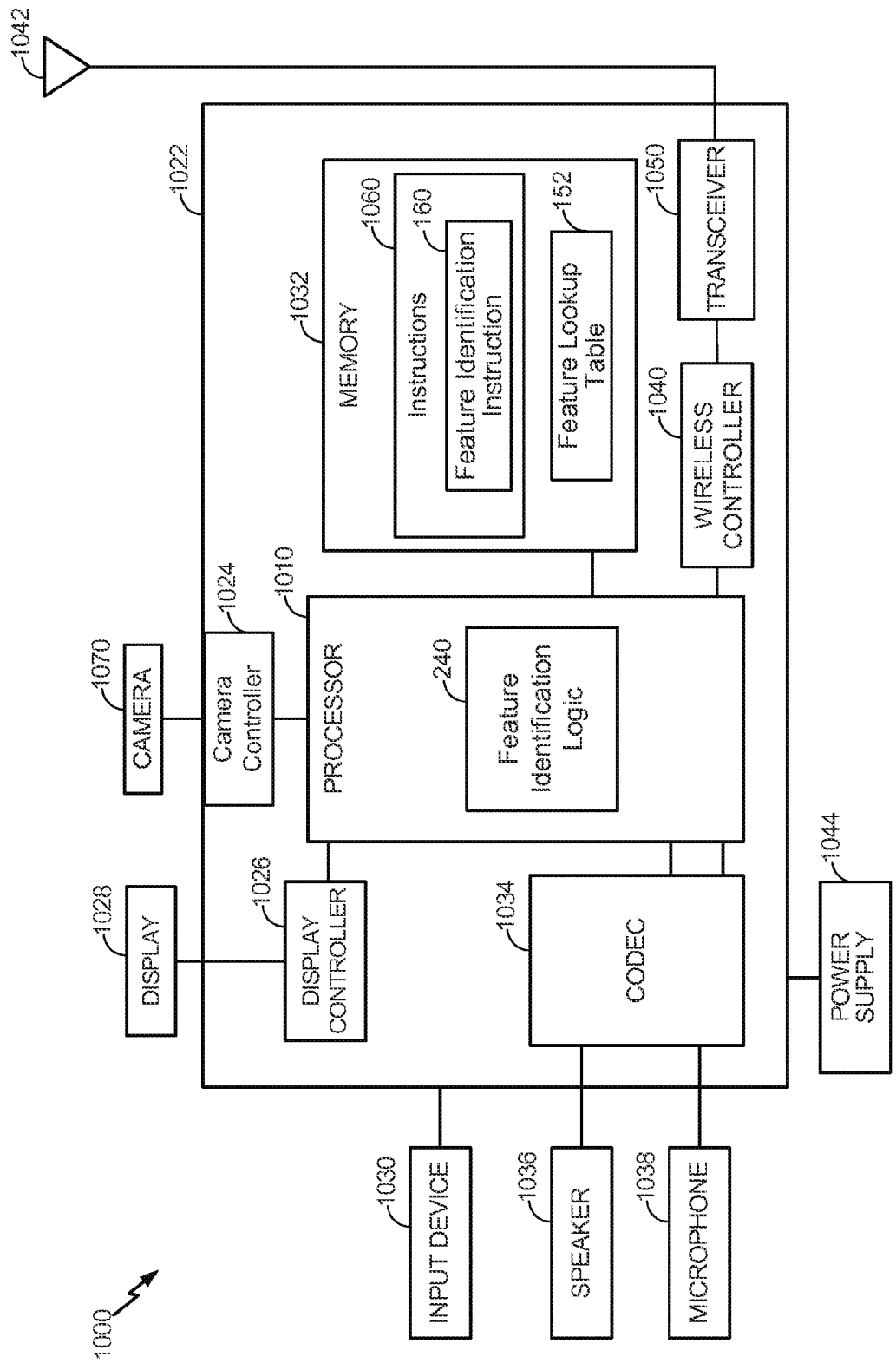
FIG. 10 is a block diagram of a wireless electronic device including components that are operable to determine whether a pixel of an image is a feature and to determine a score associated with the feature.

FIG. 10 is a block diagram of a wireless electronic device including components that are operable to determine whether a pixel of an image is a feature and to determine a score associated with the feature is depicted and generally designated 1000. The wireless electronic device 1000 includes a processor 1010 coupled to a memory 1032. In an illustrative example, the wireless electronic device 1000 may include the system 100 of FIG. 1, the system 200 of FIG. 2, or components thereof. The wireless electronic device 1000 may operate according to the methods or functions described with reference to FIGS. 1-8.

The processor 1010 may include or implement the image controller 120 of FIG. 1, the feature detection processor module 130 of FIG. 1, the feature score processor module 140 of FIG. 1, or a combination thereof. In a particular embodiment, the processor 1010 may include the feature identification logic 240 of FIG. 2. For example, such modules may be integrated into the processor 1010 and may include dedicated circuitry or other logic to perform at least a portion of the functionality described with reference to FIGS. 1-9.

The memory 1032 may be a non-transitory, tangible computer-readable and/or processor-readable storage device that stores instructions 1060. The instructions 1060 may be executable by the processor 1010 to include or implement the image controller 120 of FIG. 1, the feature detection processor module 130 of FIG. 1, the feature score processor module 140 of FIG. 1, or a combination thereof. For example, the instructions 1060 may include instructions that may be executable by the processor 1010 to perform one or more functions or methods described with respect to the feature detection processor module 130 of FIG. 1, the feature detection processor 140 of FIG. 1, or a combination thereof. The instructions 1060 may include instructions that are executable by the processor 1010 to cause the processor 1010 to perform one or more functions or methods described with reference to FIGS. 1-6, the method 700 of FIG. 7, the method 800 of FIG. 8, the method 900 of FIG. 9, or a combination thereof. To illustrate, the instructions 1060 may include code for determining whether a pixel of an image is a feature. For example, the instructions 1060 may include the feature identification instruction 160 of FIG. 1.

The memory 1032 may include instructions that are executable by the processor 1010 to perform one or more methods described herein at the wireless electronic device 1000. For example, such a wireless interface may be used to send or receive image data that contains one or more pixels of an image. For example, the image data may be the image data 122 of FIG. 1. The memory 1032 may include the feature lookup table 152 of FIG. 1. In other embodiments, one or more functions described herein as being performed by the processor 1010 executing instructions from the memory 1032 may instead be performed by dedicated hardware (e.g., a programmable logic arrays, a FPGA device, an ASIC, or a processing unit programmed to perform identified functions, such as a CPU, a DSP, a microprocessor, an ARM processor, a controller, another hardware device, or a firmware device, or any combination thereof).

FIG. 10 also shows a display controller 1026 that is coupled to the processor 1010 and to a display 1028. A coder/decoder (CODEC) 1034 can also be coupled to the processor 1010. A speaker 1036 and a microphone 1038 can be coupled to the CODEC 1034.

FIG. 10 also indicates that a wireless controller 1040 can be coupled to the processor 1010, where the wireless controller 1040 is in communication with an antenna 1042 via a transceiver 1050. The wireless controller 1040, the transceiver 1050, and the antenna 1042 may thus represent a wireless interface that enables wireless communication by the mobile communication device 1000. For example, such a wireless interface may be used to send or receive image data that contains one or more pixels of an image. For example, the image data may be the image data 122 of FIG. 1. The wireless electronic device 1000 may include numerous wireless interfaces, where different wireless networks are configured to support different networking technologies or combinations of networking technologies.

FIG. 10 illustrates that a camera 1070 may be coupled to a camera controller 1024 that may provide image data from the camera 1070 to the processor 1010. The processor 1010 may determine whether one or more pixels of an image represented by the image data are a feature of the image. The processor 1010 may be configured to determine a feature score associated with pixels that are a feature of an image. In a particular embodiment, the camera controller 1070 may be the image controller 120 of FIG. 1.

In a particular embodiment, the processor 1010, the memory 1032, the display controller 1026, the camera controller 1024, the CODEC 1034, the wireless controller 1040, and the transceiver 1050 are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the input device 1030, the speaker 1036, the microphone 1038, the antenna 1042, and the power supply 1044 are external to the system-on-chip device 1022. However, each of the input device 1030, the speaker 1036, the microphone 1038, the antenna 1042, and the power supply 1044 can be coupled to a component of the system-on-chip device 1022, such as an interface or a controller.

It should be noted that although FIG. 10 depicts a wireless electronic device, the processor 1010 and the memory 1032 may be integrated into other devices, such as a multimedia player, an entertainment unit, a navigation device, a personal digital assistant (PDA), a mobile personal computer, a smart phone, a fixed location data unit, a computing device (e.g., the computing device 110 of FIG. 1, a tablet computing device, a laptop computing device, a desktop computing device, etc.), a media device, or another device configured to process image data.

In conjunction with the described systems and methods, an apparatus is disclosed for determining whether a particular pixel of an image is a feature. The apparatus includes means for receiving data corresponding to a plurality of pixels surrounding the particular pixel, where each of the plurality of pixels is from the image. For example the means for receiving may include the processor 1010, the feature detection processor module 130 of FIG. 1, the feature score processor module 140 of FIG. 1, another device configured to receive the data corresponding to the plurality of pixels surrounding the particular pixel, or any combination thereof. The apparatus includes means for determining a set of comparison results associated with the plurality of pixels. Each comparison result of the set of comparison results may correspond to one of the plurality of pixels and may indicates a result of comparing an attribute value corresponding to the one of the plurality of pixels to a comparison value. The comparison value may be defined based on a particular attribute value of the particular pixel and a threshold value. The means for determining the set of comparison results may include the processor 1010, the feature detection processor module 130 of FIG. 1, the feature score processor module 140 of FIG. 1, another device configured to determine the set of comparison results associated with the plurality of pixels, or any combination thereof. The apparatus includes means for determining whether the set of comparison results indicates that the particular pixel is the feature by performing a table lookup operation using the set of comparison results as an index. The means for determining may include the processor 1010, the feature detection processor module 130 of FIG. 1, the feature score processor module 140 of FIG. 1, another device configured to determine whether the set of comparison results indicates that the particular pixel is the feature by performing the table lookup operation, or any combination thereof.

In conjunction with the described systems and methods, an apparatus is disclosed for determining whether a particular pixel is a feature an image. The apparatus includes means for receiving data corresponding to a plurality of pixels surrounding the particular pixel, where each of the plurality of pixels is from the image. The means for receiving the data may include the processor 1010, the feature detection processor module 130 of FIG. 1, the feature score processor module 140 of FIG. 1, another device configured to receive the data corresponding to the plurality of pixels surrounding the particular pixel, or a combination thereof. The apparatus includes means for determining a set of comparison results associated with the plurality of pixels. Each comparison result of the set of comparison results may correspond to one of the plurality of pixels and may indicates a result of comparing an attribute value corresponding to the one of the plurality of pixels to a comparison value. The comparison value may be defined based on a particular attribute value of the particular pixel and a threshold value. The means for determining the set of comparison results may include the processor 1010, the feature detection processor module 130 of FIG. 1, the feature score processor module 140 of FIG. 1, another device configured to determine a set of comparison results associated with the plurality of pixels. The apparatus includes means for determining whether the particular pixel of the image is a feature by performing a processor-executable instruction that, when executed by a processor, causes the processor to identify a subset of the set of comparison results indicating that the particular pixel is the feature. The identified subset may correspond to pixels of the plurality of pixels located in a consecutive order surrounding the particular pixel. The means for determining may include the processor 1010, the feature detection processor module 130 of FIG. 1, the feature score processor module 140 of FIG. 1, a set of logic gates such as described with reference to FIG. 5, another device configured to determine whether the particular pixel is the feature of the image by performing the processor-executable instruction that, when executed by the processor, causes the processor to identify a subset of the set of comparison results indicating that the particular pixel is the feature, or any combination thereof. The apparatus may include means for capturing image data of the image, where the data corresponding to the plurality of pixels is included in the image data. The means for capturing may include the image controller 120 of FIG. 1, the camera controller 824, another device configured to capture the image data, or any combination thereof.

In conjunction with the described systems and methods, an apparatus is disclosed. The apparatus includes means for determining whether a particular pixel of an image satisfies a first feature test based on a first operation that depends on a particular attribute value of the particular pixel, a threshold value, and attribute values of each of a plurality of pixels surrounding the particular pixel. The means for determining may include the processor 1010, the feature detection processor module 130 of FIG. 1, the feature score processor module 140 of FIG. 1, another device configured to determine whether the particular pixel of an image satisfies the first feature test based on the first operation that depends on the particular attribute value of the particular pixel, the threshold value, and the attribute values of each of the plurality of pixels surrounding the particular pixel, or a combination thereof. The apparatus includes means for modifying the threshold value in response to determining that the particular pixel satisfies the first feature test. The means for modifying the threshold value may include the processor 1010, the feature detection processor module 130 of FIG. 1, the feature score processor module 140 of FIG. 1, another device configured to modify the threshold value in response to determining that the particular pixel satisfies the first feature test, or any combination thereof. The apparatus includes means for determining whether the particular pixel of the image satisfies a second feature test based on a second operation that depends on the particular attribute value of the particular pixel, the modified threshold value, and the attribute values of each of the plurality of pixels surrounding the particular pixel. The means for determining may include the processor 1010, the feature detection processor module 130 of FIG. 1, the feature score processor module 140 of FIG. 1, another device configured to determine whether the particular pixel of the image satisfies the second feature test based on the second operation that depends on the particular attribute value of the particular pixel, the modified threshold value, and the attribute values of each of the plurality of pixels surrounding the particular pixel, or any combination thereof. The apparatus includes means for determining a score associated with the particular pixel, where, when the particular pixel satisfies the second feature test based on the second operation, the score is based on the modified threshold value. The means for determining the score may include the processor 1010, the feature detection processor module 130 of FIG. 1, the feature score processor module 140 of FIG. 1, another device configured to determine the score associated with the particular pixel, where, when the particular pixel satisfies the second feature test based on the second operation, the score is based on the modified threshold value, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in the ASIC. The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method of processing an image, the method comprising:
   receiving data corresponding to a plurality of pixels surrounding a particular pixel, wherein each of the plurality of pixels is from an image;
   determining whether the particular pixel satisfies a first feature test of a plurality of feature tests, the first feature test based on a threshold value and a comparison value;
   modifying the threshold value in response to determining that the particular pixel satisfies the first feature test;
   determining whether the particular pixel satisfies a second feature test of the plurality of features tests based on the modified threshold value, wherein the modified threshold value is decremented upon determining that the particular pixel does not satisfy the second feature test;
   determining a set of comparison results based on the plurality of feature tests; and
   determining whether the particular pixel of the image is a feature by executing a single processor-executable instruction that, when executed by a processor, causes the processor to identify a subset of the set of comparison results indicating that the particular pixel is the feature, wherein the identified subset corresponds to pixels of the plurality of pixels located in a consecutive order surrounding the particular pixel.

2. The method of claim 1, wherein the comparison value comprises a sum of an attribute value of the particular pixel and the threshold value.

3. The method of claim 1, wherein the comparison value comprises a difference of an attribute value of the particular pixel and the threshold value.

4. The method of claim 1, wherein each comparison result of the subset of the set of comparison results identified by the processor indicates that an attribute value of a surrounding pixel is greater than a sum of an attribute value of the particular pixel and the threshold value or that the attribute value of the surrounding pixel is less than a difference of the attribute value of the particular pixel and the threshold value.

5. The method of claim 1, wherein the plurality of pixels includes 16 pixels and the identified subset of the set of comparison results is associated with 9 pixels of the plurality of pixels.

6. The method of claim 1, wherein the feature is a corner.

7. The method of claim 1, wherein the plurality of feature tests are based on comparisons of attribute values of each of the plurality of pixels to the comparison value, the comparison value based on a particular attribute value of the particular pixel and the threshold value, and wherein the particular attribute value is an intensity value and the threshold value is a threshold intensity value.

8. The method of claim 1, wherein determining whether the particular pixel is the feature is performed in a mobile phone, a computing device, a portable electronic device, a tablet computing device, an electronic reader device, a game console, a camera, a peripheral thereof, or any combination thereof.

9. The method of claim 1, wherein the set of comparison results is determined by a vector compare operation that performs comparisons of attribute values of each of the plurality of pixels to the comparison value.

10. A method of processing an image, the method comprising:
    determining whether a particular pixel of an image is a feature by:
    receiving data corresponding to a plurality of pixels surrounding the particular pixel, wherein each of the plurality of pixels is from the image;
    determining a set of comparison results associated with the plurality of pixels, wherein each comparison result of the set of comparison results corresponds to one of the plurality of pixels and indicates a result of comparing an attribute value corresponding to the one of the plurality of pixels to a comparison value, and wherein the comparison value is based on a particular attribute value of the particular pixel and an adjustable threshold value; and
    determining whether the set of comparison results indicates that the particular pixel is the feature by performing a table lookup operation on a lookup table using the set of comparison results as an index to identify a value of a feature flag, the value of the feature flag indicating whether the particular pixel is the feature.

11. The method of claim 10, wherein the set of comparison results is determined by a vector compare operation that performs comparisons of attribute values of each of the plurality of pixels to the comparison value.

12. The method of claim 11, wherein the comparison value is a sum of the attribute value and the adjustable threshold value.

13. The method of claim 11, wherein the comparison value is a difference of the attribute value and the adjustable threshold value.

14. The method of claim 10, wherein the particular attribute value is an intensity value and the adjustable threshold value is a threshold intensity value.

15. The method of claim 10, wherein determining whether the particular pixel is the feature is performed in a mobile phone, a computing device, a portable electronic device, a tablet computing device, an electronic reader device, a game console, a camera, a peripheral thereof, or any combination thereof.

16. A method of processing an image, the method comprising:
- determining whether a particular pixel of an image satisfies a first feature test based on a first operation that depends on a particular attribute value of the particular pixel, a threshold value, and attribute values of each of a plurality of pixels surrounding the particular pixel;
- in response to determining that the particular pixel satisfies the first feature test, modifying the threshold value;
- determining whether the particular pixel of the image satisfies a second feature test based on a second operation that depends on the particular attribute value of the particular pixel, the modified threshold value, and the attribute values of each of the plurality of pixels surrounding the particular pixel;
- when the particular pixel satisfies the second feature test, determining a score associated with the particular pixel based on the modified threshold value; and
- when the particular pixel does not satisfy the second feature test, decrementing the modified threshold value.

17. The method of claim 16, wherein, when the particular pixel satisfies the first feature test but fails to satisfy the second feature test, the score is based on the threshold value.

18. The method of claim 16, wherein the first operation includes a table lookup operation.

19. The method of claim 18, wherein the particular pixel satisfies the first feature test when the table lookup operation locates a table entry a set of comparison results associated with the particular pixel, wherein the set of comparison results is determined by a vector compare operation that performs comparisons of attribute values of each of the plurality of pixels to a comparison value, the comparison value based on the particular attribute value and the threshold value.

20. The method of claim 19, wherein the comparison value is a sum of the particular attribute value and the threshold value.

21. The method of claim 19, wherein the comparison value is a difference of the particular attribute value and the threshold value.

22. The method of claim 16, wherein the first operation is performed via execution of a single processor-executable instruction.

23. The method of claim 22, wherein the particular pixel satisfies the first feature test when the single processor executable instruction identifies a subset of a set of comparison results associated with the particular pixel that indicates the particular pixel is a feature of the image, wherein the set of comparison results is based on comparisons of attribute values of each of the plurality of pixels to a comparison value, the comparison value based on the particular attribute value and the threshold value.

24. The method of claim 16, further comprising:
- in response to determining that the particular pixel satisfies the second feature test, performing one or more third feature tests based on one or more further modified threshold values; and
- in response to determining that the particular pixel satisfies a particular third feature test, setting a value of the score based on a particular further modified threshold value corresponding to the particular third feature test.

25. An apparatus comprising:
a processor; and
a memory accessible to the processor, the memory comprising processor-executable instructions that, when executed by the processor, cause the processor to determine whether a particular pixel of an image is a feature by:
- receiving data corresponding to a plurality of pixels surrounding the particular pixel, wherein each of the plurality of pixels is from the image;
- determining a set of comparison results associated with the plurality of pixels, wherein each comparison result of the set of comparison results corresponds to one of the plurality of pixels and indicates a result of comparing an attribute value corresponding to the one of the plurality of pixels to a comparison value, and wherein the comparison value is based on a particular attribute value of the particular pixel and an adjustable threshold value; and
- determining whether the set of comparison results indicates that the particular pixel is the feature by performing a table lookup operation on a lookup table using the set of comparison results as an index to identify a value of a feature flag, the value of the feature flag indicating whether the particular pixel is the feature.

26. The apparatus of claim 25, wherein the set of comparison results is determined by a vector compare operation that performs comparisons of attribute values of each of the plurality of pixels to the comparison value.

27. An apparatus comprising:
a processor; and
a memory accessible to the processor, the memory comprising processor-executable instructions that, when executed by the processor, cause the processor to:
- receive data corresponding to a plurality of pixels surrounding a particular pixel, wherein each of the plurality of pixels is from an image;
- determine whether the particular pixel satisfies a first feature test of a plurality of feature tests, the first feature test based on a threshold value and a comparison value;
- modify the threshold value in response to determining that the particular pixel satisfies the first feature test;
- determine whether the particular pixel satisfies a second feature test of the plurality of features tests based on the modified threshold value, wherein the modified threshold value is decremented upon determining that the particular pixel does not satisfy the second feature test;
- determine a set of comparison results based on the plurality of feature tests; and
- determine whether the particular pixel of the image is a feature by executing a single instruction of the processor-executable instructions to identify a subset of the set of comparison results indicating that the particular pixel is the feature, wherein the identified subset corresponds to pixels of the plurality of pixels located in a consecutive order surrounding the particular pixel.

28. The apparatus of claim 27, wherein each comparison result of the subset of the set of comparison results identified by the processor indicates that the attribute value is greater than a sum of the particular attribute value and the threshold value or that the attribute value is less than a difference of the particular attribute value and the threshold value.

29. The apparatus of claim 27, wherein the set of comparison results is determined by a vector compare operation that performs comparisons of attribute values of each of the plurality of pixels to the comparison value.

30. An apparatus comprising:
a processor; and a memory accessible to the processor, the memory comprising processor-executable instructions that, when executed by the processor, cause the processor to:
    determine whether a particular pixel of an image satisfies a first feature test based on a first operation that depends on a particular attribute value of the particular pixel, a threshold value, and attribute values of each of a plurality of pixels surrounding the particular pixel;
    modify the threshold value in response to determining that the particular pixel satisfies the first feature test;
    determine whether the particular pixel of the image satisfies a second feature test based on a second operation that depends on the particular attribute value of the particular pixel, the modified threshold value, and the attribute values of each of the plurality of pixels surrounding the particular pixel;
    when the particular pixel satisfies the second feature test based on the second operation, determine a score associated with the particular pixel based on the modified threshold value; and
    when the particular pixel does not satisfy the second feature test, decrement the modified threshold value.

31. The apparatus of claim 30, wherein, when the particular pixel satisfies the first feature test but fails to satisfy the second feature test, the score is based on the threshold value.

32. The apparatus of claim 30, wherein the processor-executable instructions, when executed by the processor, further cause the processor to:
    perform one or more third feature tests based on one or more further modified threshold values in response to determining that the particular pixel satisfies the second feature test; and
    determine the score based on a particular further modified threshold value corresponding to a particular third feature test, in response to determining that the particular pixel satisfies the particular third feature test.

33. A non-transitory processor-readable medium storing processor-executable instructions that, when executed by a processor, cause the processor to determine whether a particular pixel of an image is a feature by:
    receiving data corresponding to a plurality of pixels surrounding the particular pixel, wherein each of the plurality of pixels is from the image;
    determining a set of comparison results associated with the plurality of pixels, wherein each comparison result of the set of comparison results corresponds to one of the plurality of pixels and indicates a result of comparing an attribute value corresponding to the one of the plurality of pixels to a comparison value, and wherein the comparison value is based on a particular attribute value of the particular pixel and an adjustable threshold value; and
    determining whether the set of comparison results indicates that the particular pixel is the feature by performing a table lookup operation on a lookup table using the set of comparison results as an index to identify a value of a feature flag, the value of the feature flag indicating whether the particular pixel is the feature.

34. A non-transitory processor-readable medium storing processor-executable instructions that, when executed by a processor, cause the processor to:
    receive data corresponding to a plurality of pixels surrounding a particular pixel, wherein each of the plurality of pixels is from an image;
    determining whether the particular pixel satisfies a first feature test of a plurality of feature tests, the first feature test based on a threshold value and a comparison value;
    modifying the threshold value in response to determining that the particular pixel satisfies the first feature test;
    determining whether the particular pixel satisfies a second feature test of the plurality of features tests based on the modified threshold value, wherein the modified threshold value is decremented upon determining that the particular pixel does not satisfy the second feature test;
    determine a set of comparison results based on the plurality of feature tests; and
    determine whether the particular pixel of the image is a feature by executing a single instruction of the processor-executable instructions to identify a subset of the set of comparison results indicating that the particular pixel is the feature, wherein the identified subset corresponds to pixels of the plurality of pixels located in a consecutive order surrounding the particular pixel.

35. A non-transitory processor-readable medium storing processor-executable instructions that, when executed by a processor, cause the processor to:
    determine whether a particular pixel of an image satisfies a first feature test based on a first operation that depends on a particular attribute value of the particular pixel, a threshold value, and attribute values of each of a plurality of pixels surrounding the particular pixel;
    modify the threshold value in response to determining that the particular pixel satisfies the first feature test;
    determine whether the particular pixel of the image satisfies a second feature test based on a second operation that depends on the particular attribute value of the particular pixel, the modified threshold value, and the attribute values of each of the plurality of pixels surrounding the particular pixel;
    when the particular pixel satisfies the second feature test based on the second operation, determine a score associated with the particular pixel based on the modified threshold value; and
    when the particular pixel does not satisfy the second feature test, decrement the modified threshold value.

36. The non-transitory processor-readable medium of claim 35, wherein, when the particular pixel satisfies the first feature test but fails to satisfy the second feature test, the score is based on the threshold value.

37. The non-transitory processor-readable medium of claim 36, wherein the processor-executable instructions, when executed by the processor, further cause the processor to:
    perform one or more third feature tests based on one or more further modified threshold values in response to determining that the particular pixel satisfies the second feature test; and
    set the score based on a particular further modified threshold value corresponding to a particular third feature test, in response to determining that the particular pixel satisfies the particular third feature test.

38. An apparatus for determining whether a particular pixel of an image is a feature, the apparatus comprising:
    means for receiving data corresponding to a plurality of pixels surrounding the particular pixel, wherein each of the plurality of pixels is from the image;
    means for determining a set of comparison results associated with the plurality of pixels, wherein each comparison result of the set of comparison results corresponds to one of the plurality of pixels and indicates a result of comparing an attribute value corresponding to the one of the plurality of pixels to a comparison value, and wherein the comparison value is based on a particular attribute value of the particular pixel and an adjustable threshold value; and means for determining whether the set of comparison results indicates that the particular pixel is the feature by performing a table lookup operation on a lookup table using the set of comparison results as an index to identify a value of a feature flag, the value of the feature flag indicating whether the particular pixel is the feature.

39. The apparatus of claim 38, further comprising means for capturing image data of the image, wherein the data corresponding to the plurality of pixels is included in the image data.

40. An apparatus for determining whether a particular pixel of an image is a feature, the apparatus comprising:

means for receiving data corresponding to a plurality of pixels surrounding a particular pixel, wherein each of the plurality of pixels is from an image;

means for determining whether the particular pixel satisfies a first feature test of a plurality of feature tests, the first feature test based on a threshold value and a comparison value;

means for modifying the threshold value in response to determining that the particular pixel satisfies the first feature test;

means for determining whether the particular pixel satisfies a second feature test of the plurality of features tests based on the modified threshold value, wherein the modified threshold value is decremented upon determining that the particular pixel does not satisfy the second feature test;

means for determining a set of comparison results based on the plurality of feature tests; and means for determining whether the particular pixel of the image is a feature by executing a single processor-executable instruction that, when executed by a processor, causes the processor to identify a subset of the set of comparison results indicating that the particular pixel is the feature, wherein the identified subset corresponds to pixels of the plurality of pixels located in a consecutive order surrounding the particular pixel.

41. The apparatus of claim 40, further comprising means for capturing image data of the image, wherein the data corresponding to the plurality of pixels is included in the image data.

42. An apparatus comprising:

means for determining whether a particular pixel of an image satisfies a first feature test based on a first operation that depends on a particular attribute value of the particular pixel, a threshold value, and attribute values of each of a plurality of pixels surrounding the particular pixel;

means for modifying the threshold value in response to determining that the particular pixel satisfies the first feature test;

means for determining whether the particular pixel of the image satisfies a second feature test based on a second operation that depends on the particular attribute value of the particular pixel, the modified threshold value, and the attribute values of each of the plurality of pixels surrounding the particular pixel; and means for determining a score associated with the particular pixel, wherein, when the particular pixel satisfies the second feature test based on the second operation, the score is based on the modified threshold value, and wherein when the particular pixel does not satisfy the second feature test, decrement the modified threshold value.

* * * * *